United States Patent [19]
Collins

[11] Patent Number: 5,647,629
[45] Date of Patent: Jul. 15, 1997

[54] REFLECTION ELIMINATOR

[76] Inventor: Richard M. Collins, 5300 NW. 66th Pl., Johnston, Iowa 50131

[21] Appl. No.: 606,007

[22] Filed: Feb. 12, 1996

[51] Int. Cl.$^6$ .................................................. B62D 25/14
[52] U.S. Cl. ........................ 296/97.2; 296/97.7; 296/70; 180/90
[58] Field of Search ............................. 296/97.2, 97.7, 296/70; 180/90

[56] References Cited

U.S. PATENT DOCUMENTS

| | | | |
|---|---|---|---|
| 3,133,139 | 5/1964 | Beers | 296/97.2 X |
| 3,549,469 | 12/1970 | Wilfert | 296/70 |
| 5,316,359 | 5/1994 | Lansinger | 296/97.2 X |

FOREIGN PATENT DOCUMENTS

| | | | |
|---|---|---|---|
| 1028476 | 5/1953 | France | 296/97.2 |
| 1447203 | 6/1966 | France | 296/97.7 |

*Primary Examiner*—Joseph D. Pape

[57] ABSTRACT

A structure which is a plurality of vertical members with or without one or more vertical support members and with or without a bottom in a configuration which results in the prevention of the reflection of light rays and the prevention of the reflection of images from entering the eyes of viewers. This structure can be of any size and can be placed on horizontal or near horizontal surfaces at or near the bases of windows which are at angles from vertical for the purpose of eliminating reflected images and reflected light rays. In an alternative embodiment, vertical members alone or in any combination with vertical support members and bottoms can be an integral part of a passenger automobile or truck automobile or a building in which windows are at angles from vertical. In both embodiments, this reflection eliminator eliminates reflected light rays and reflected images when said reflection eliminator is on or is in a horizontal or near horizontal surface at or near the bottom of a window which is at an angle from vertical.

8 Claims, 44 Drawing Sheets

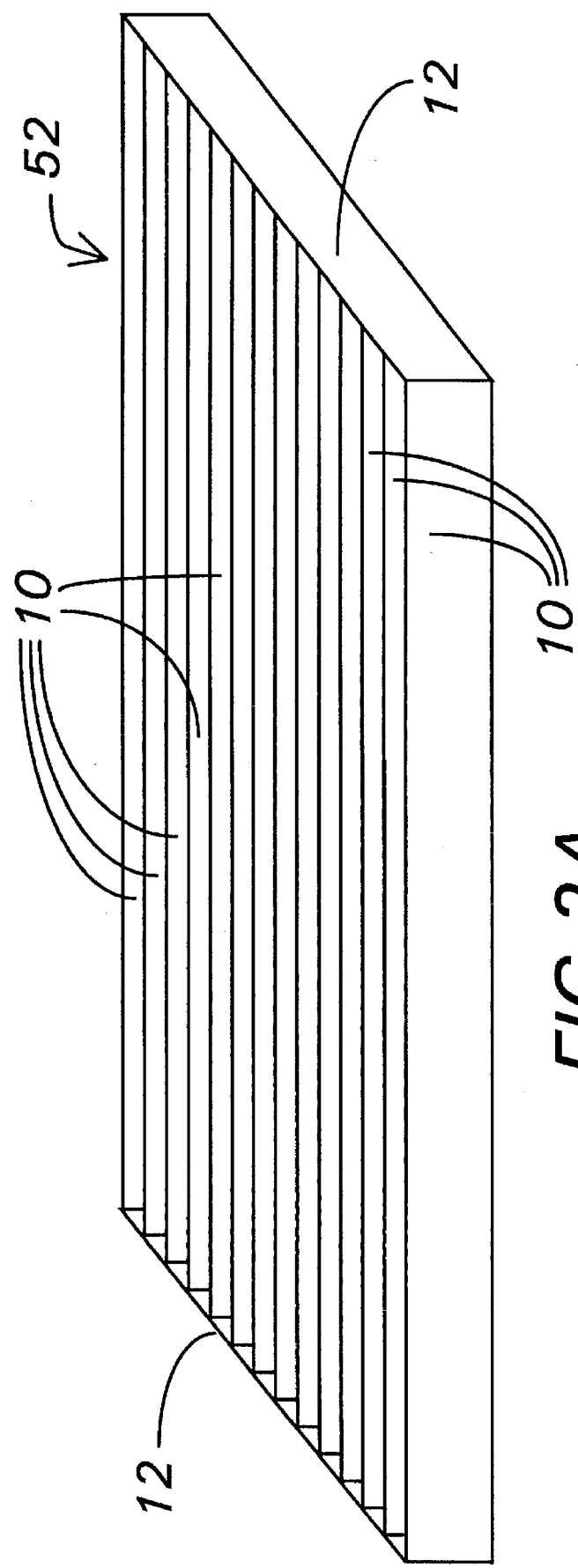

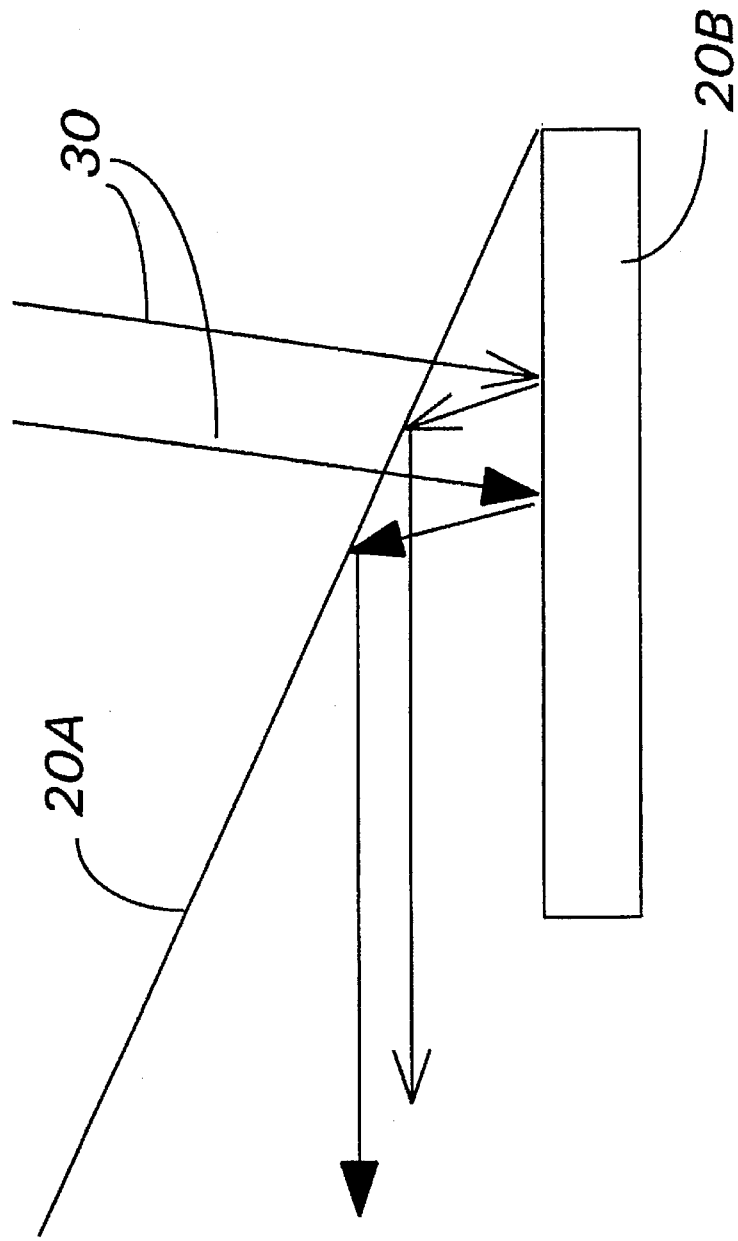
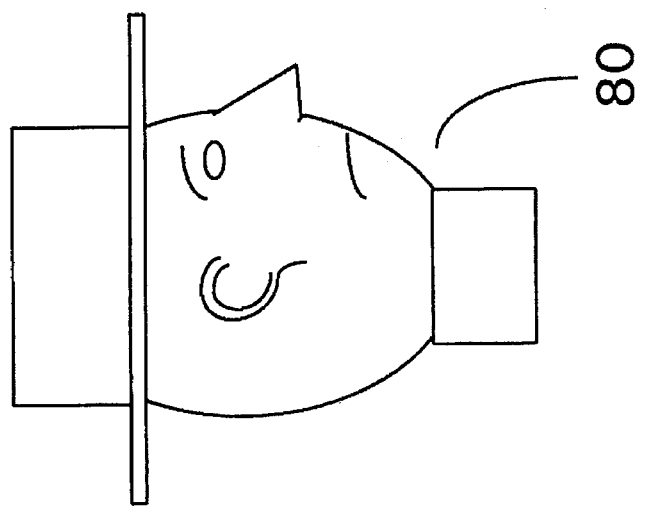
FIG.5

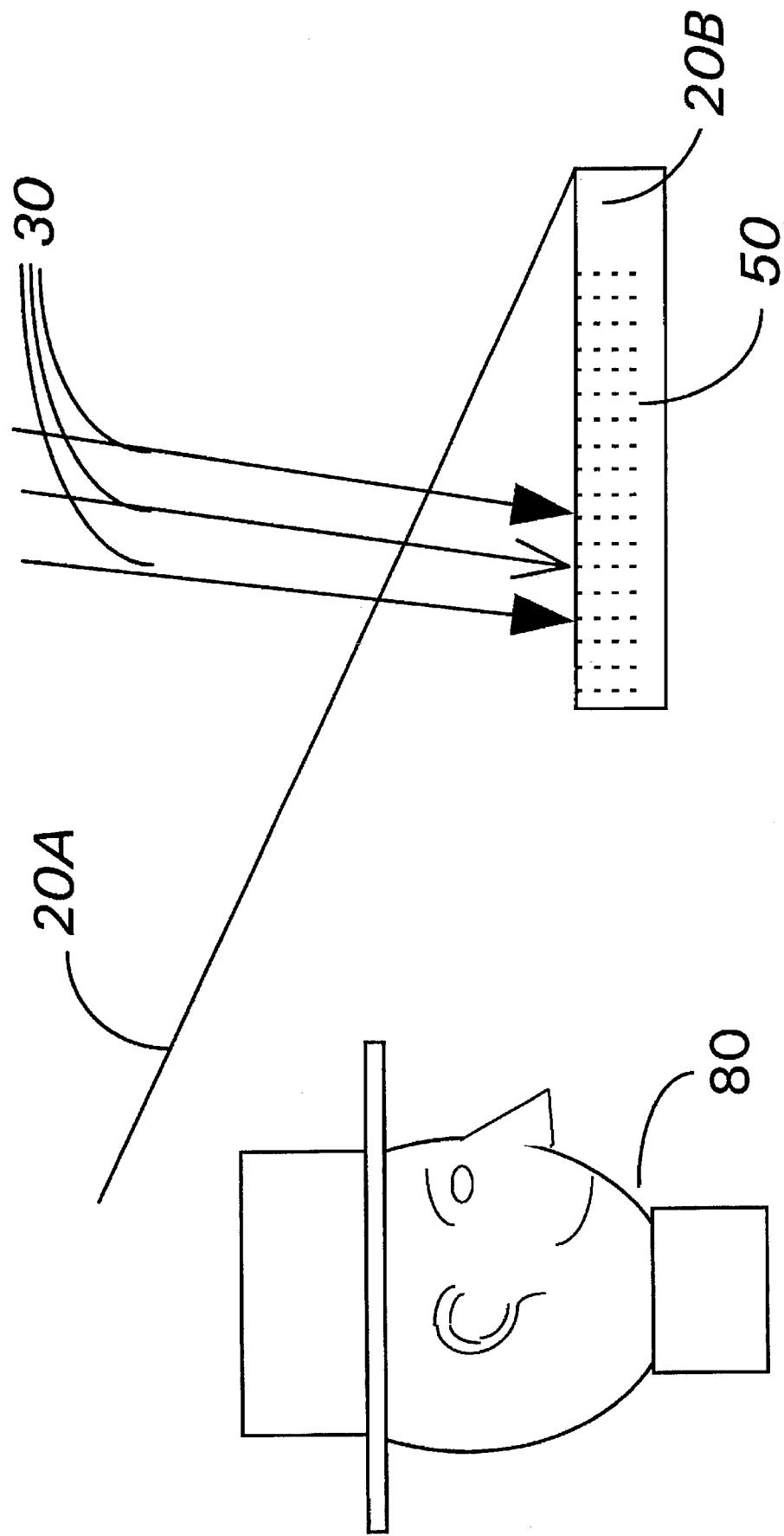

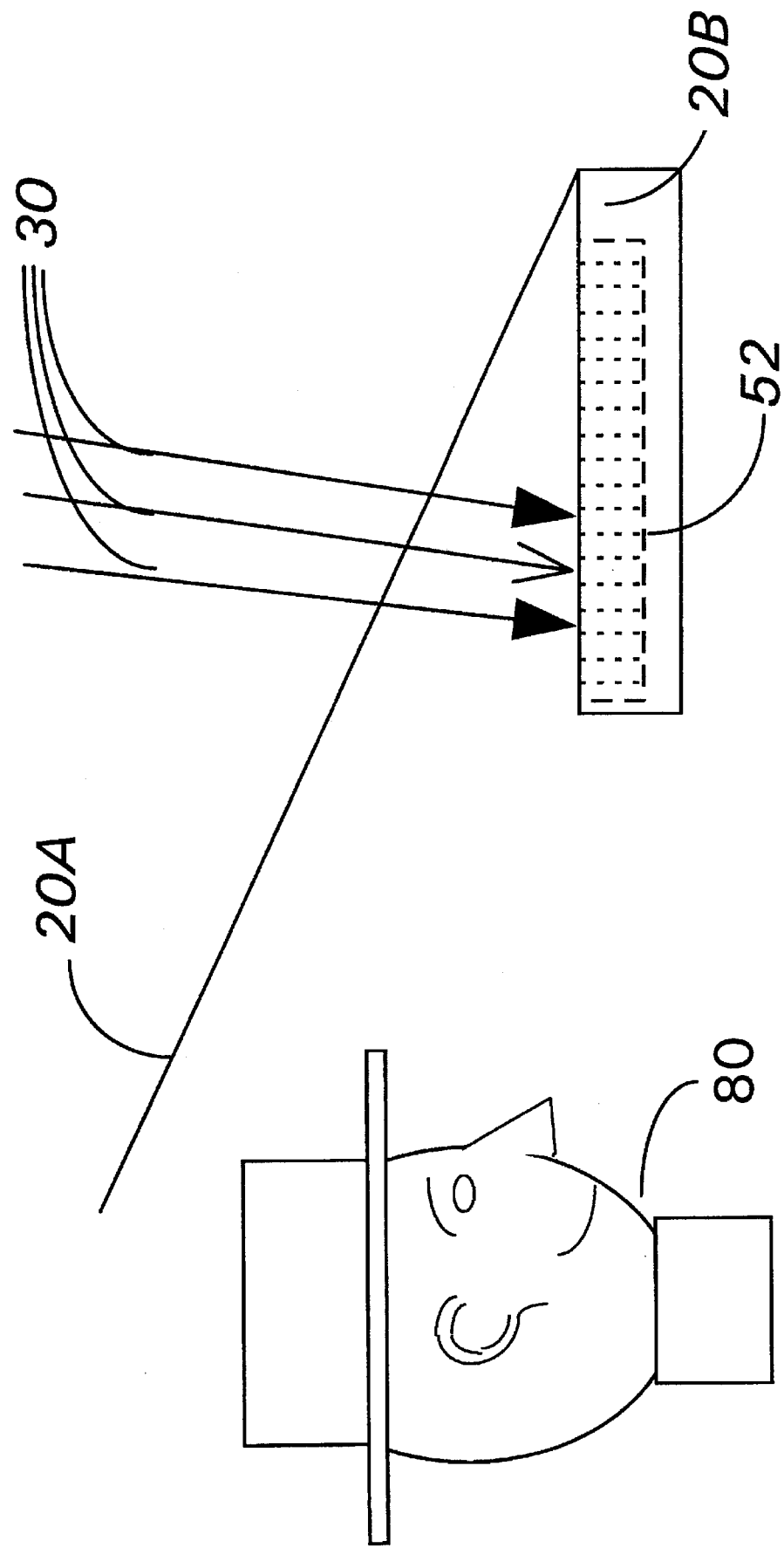

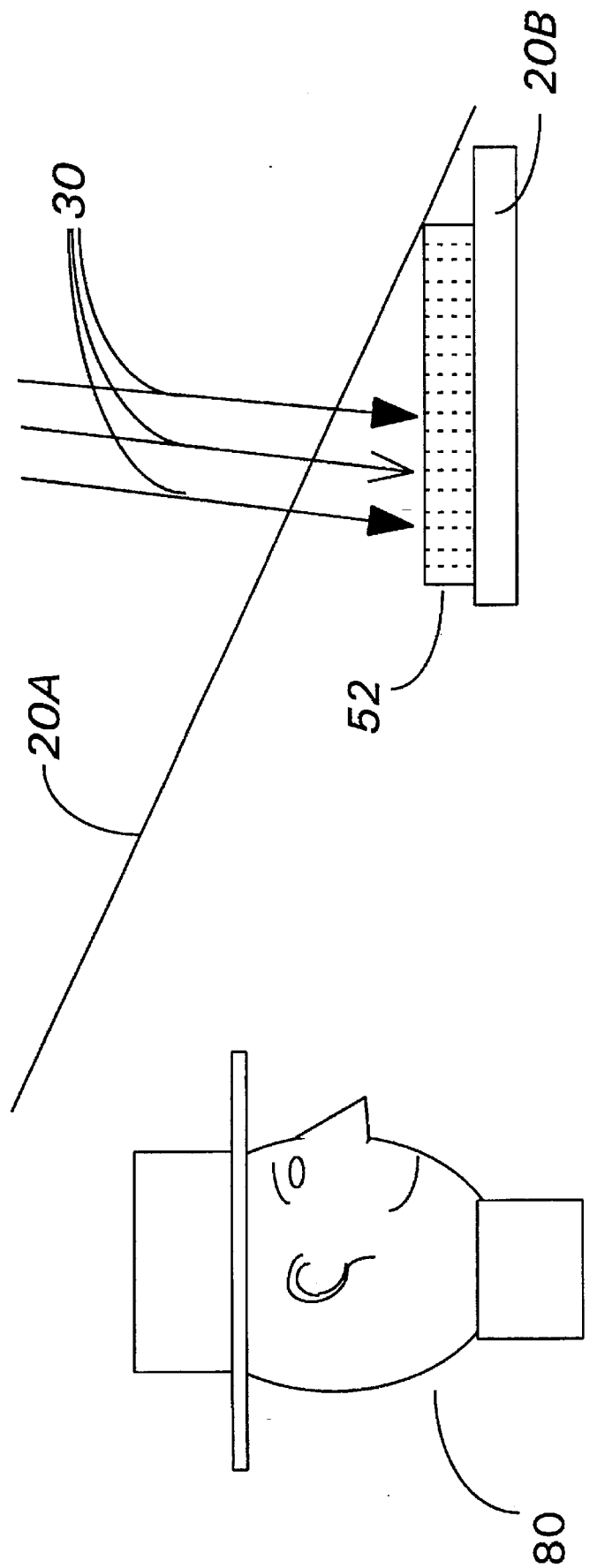

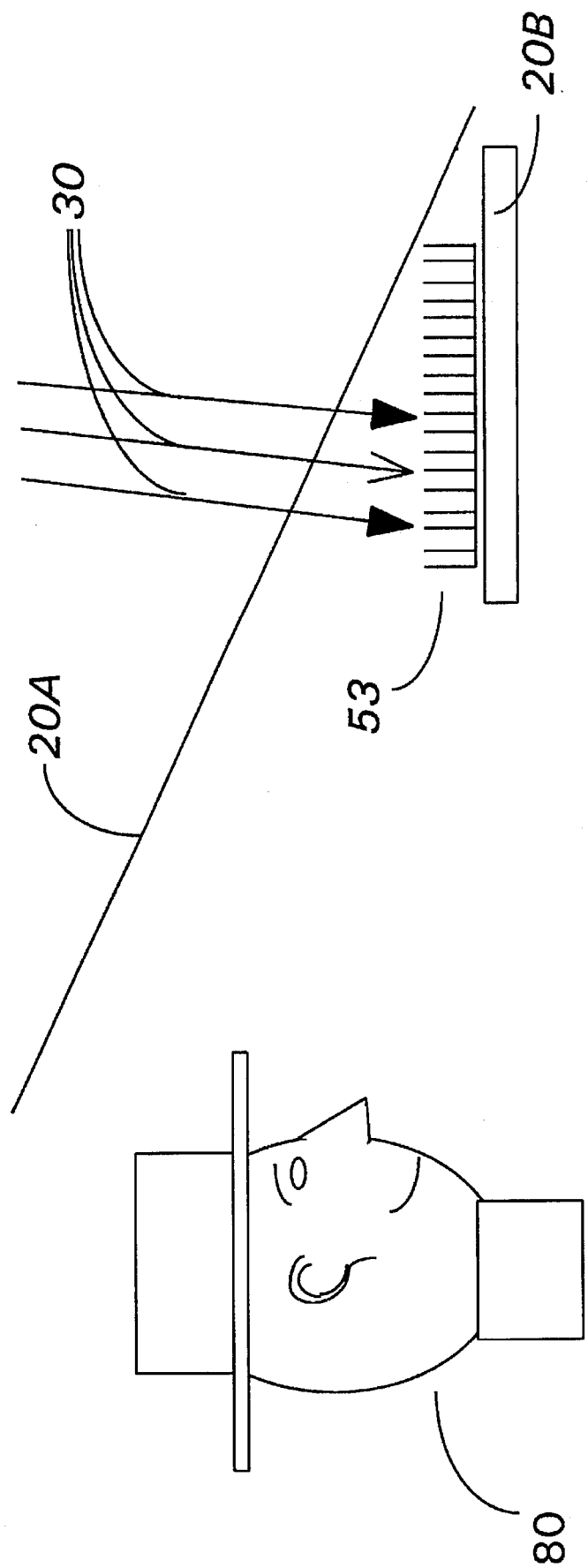

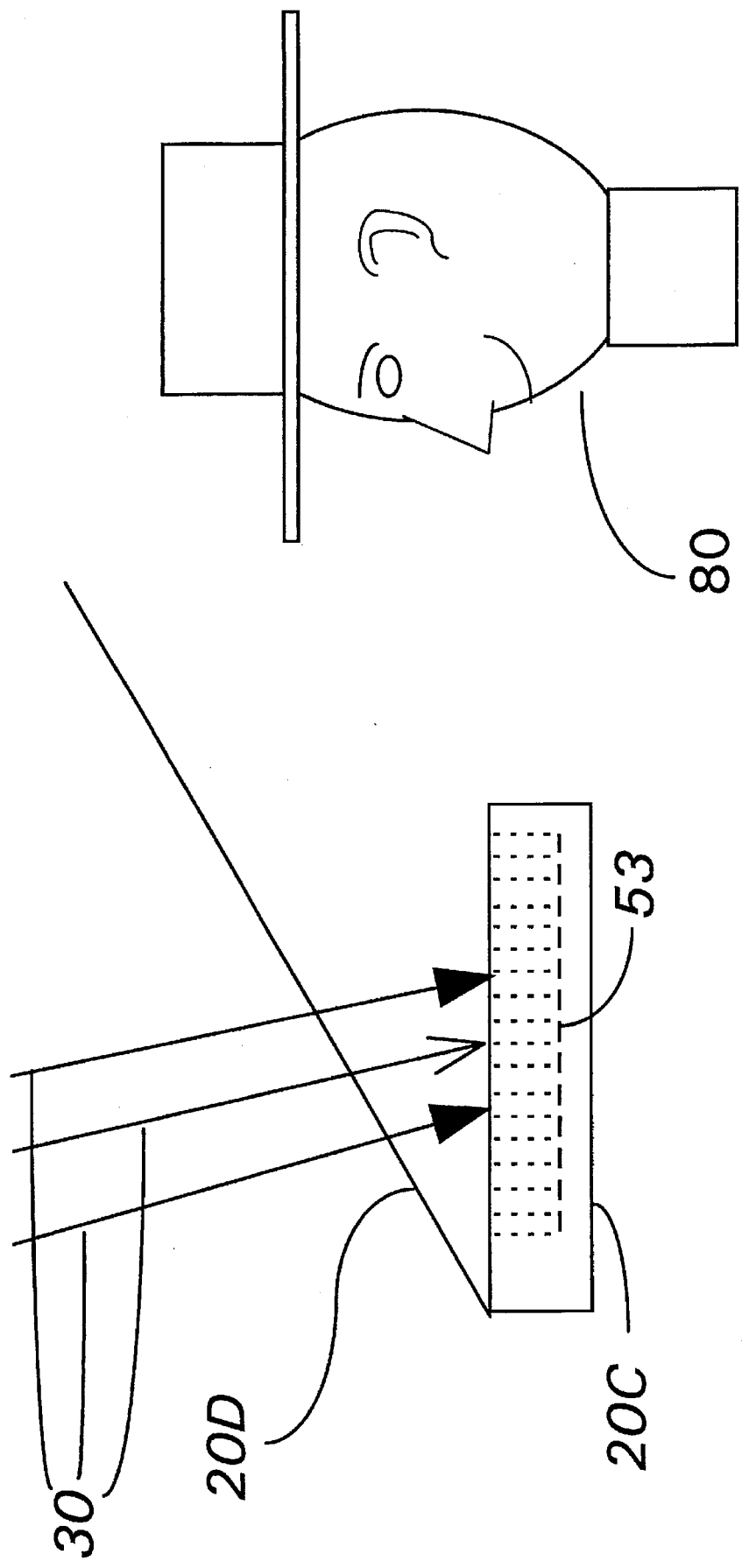

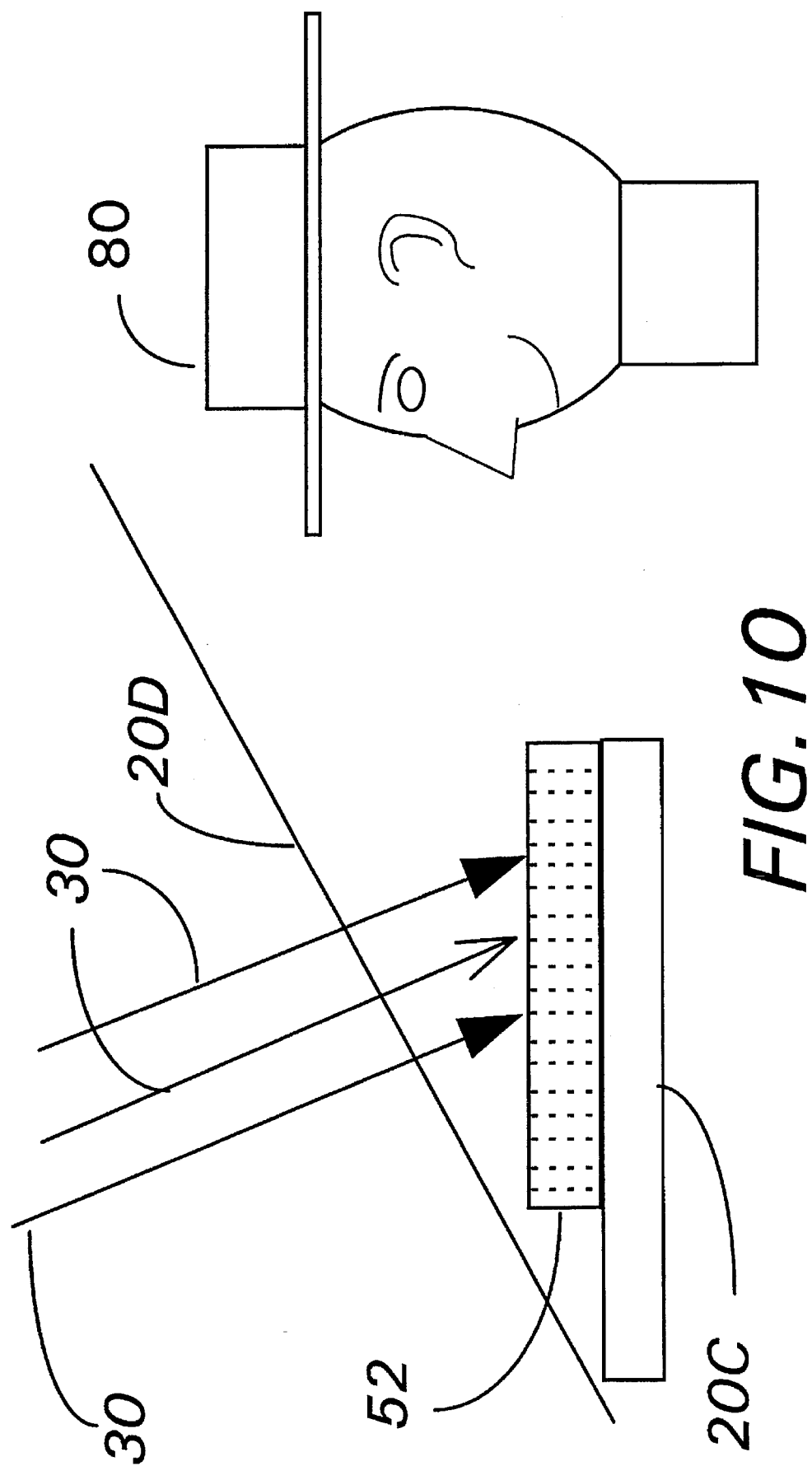

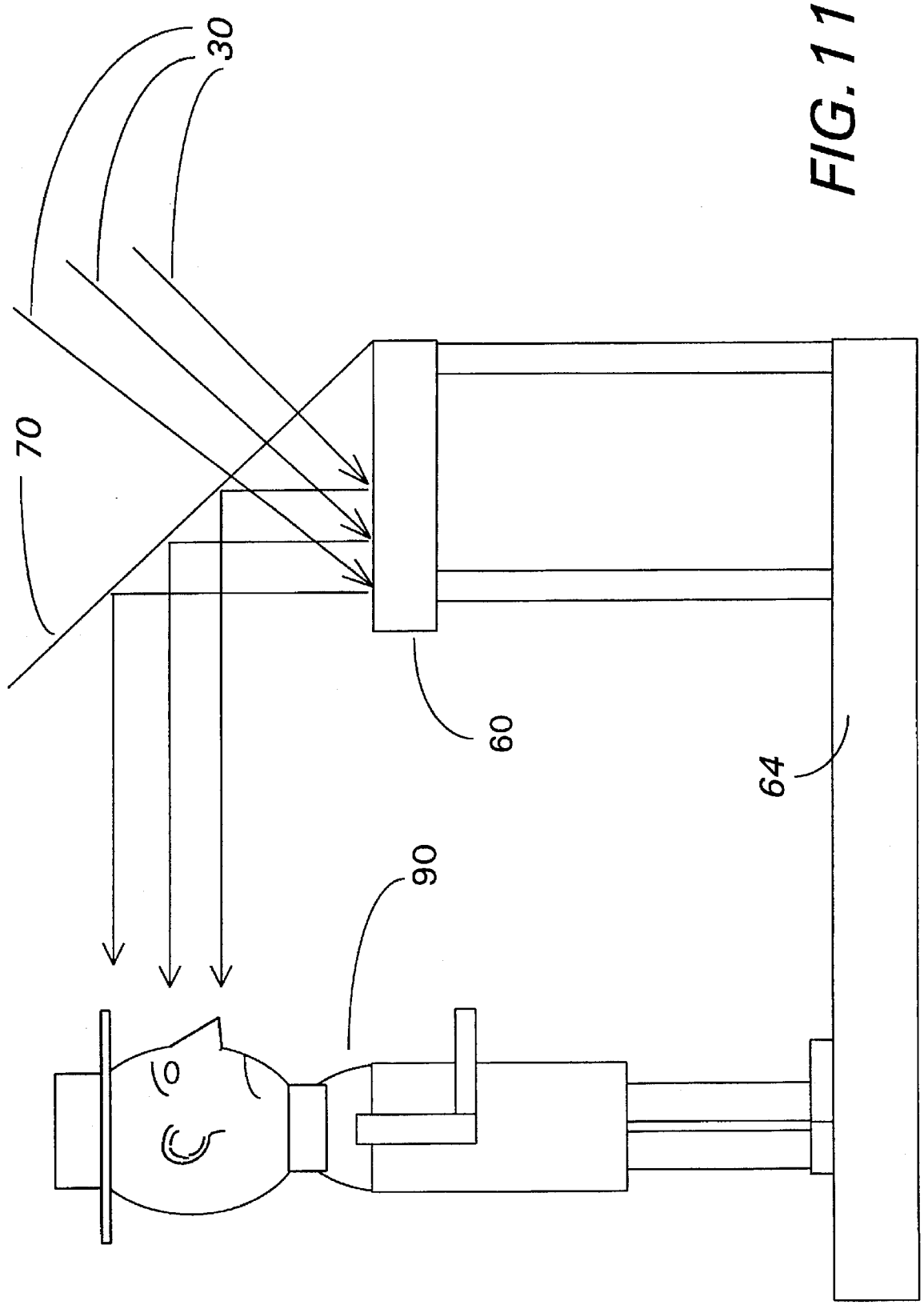

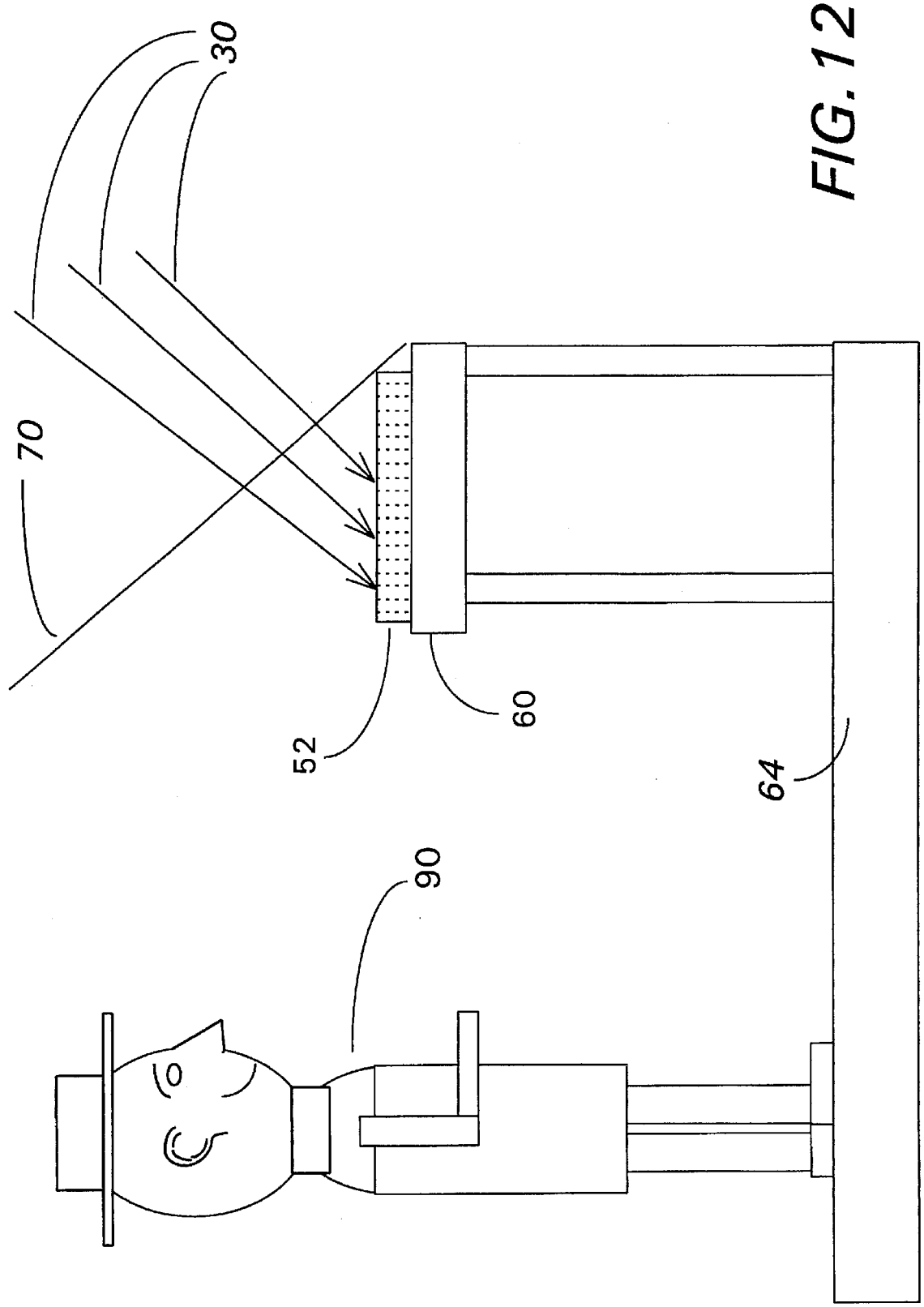

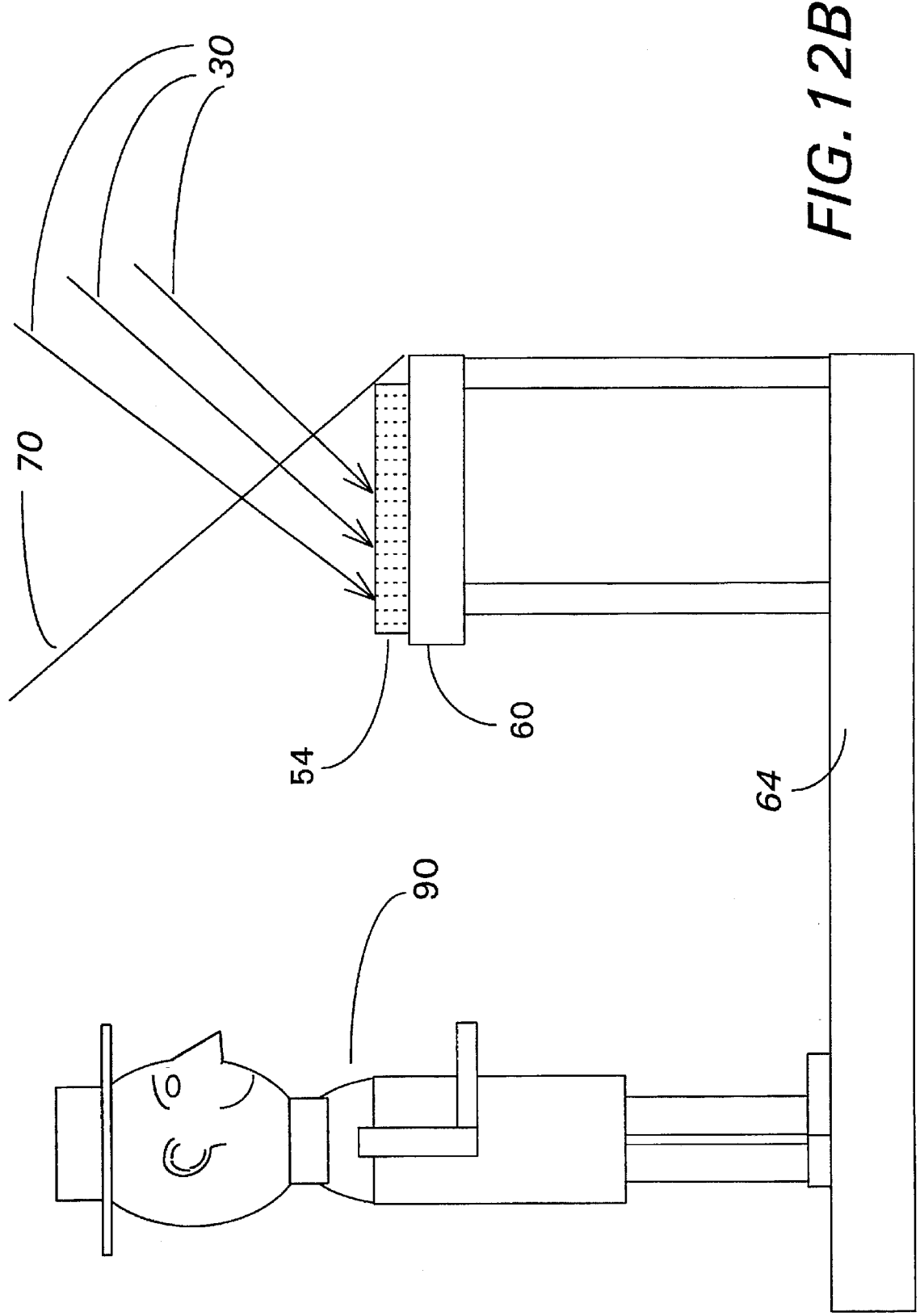

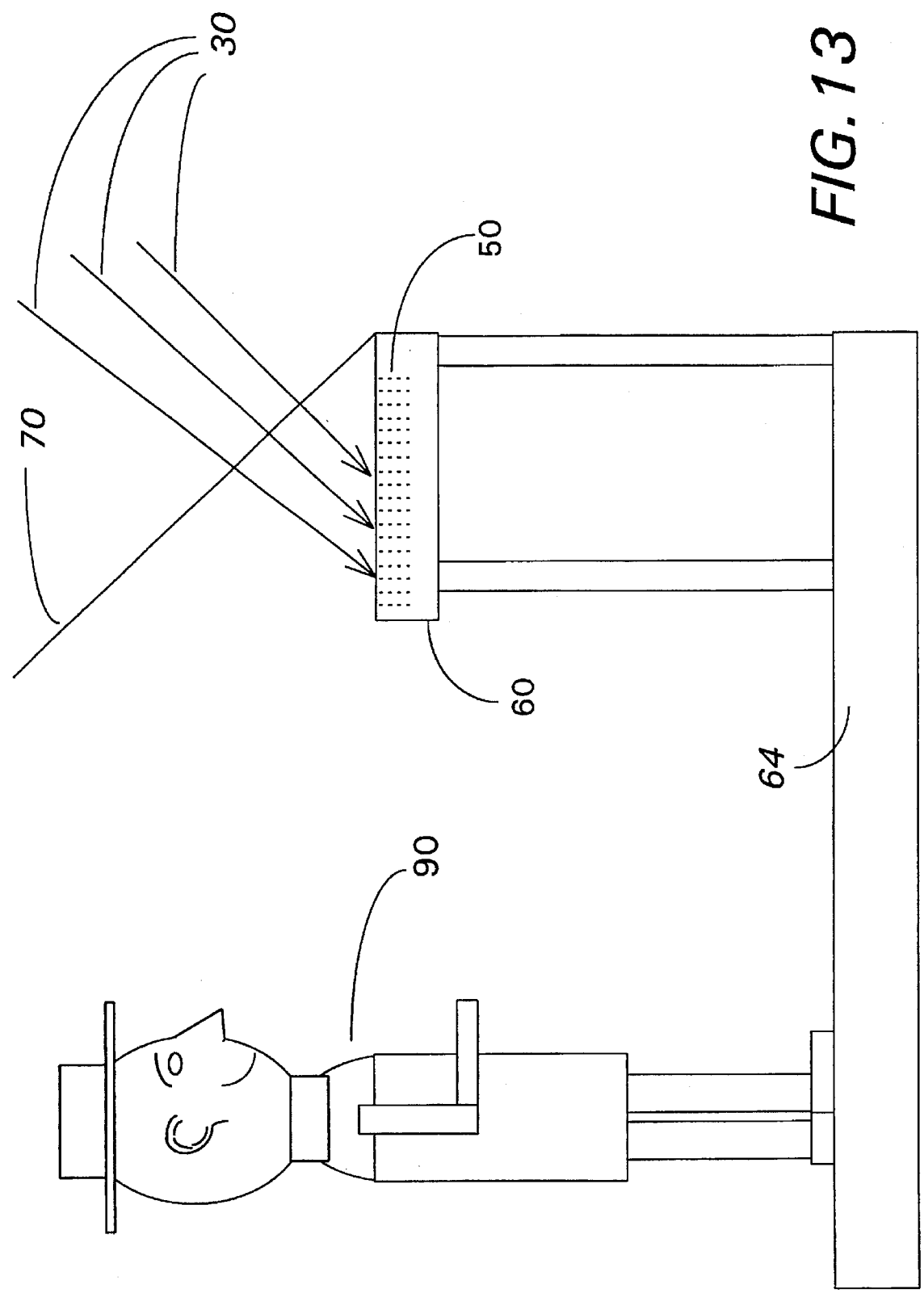

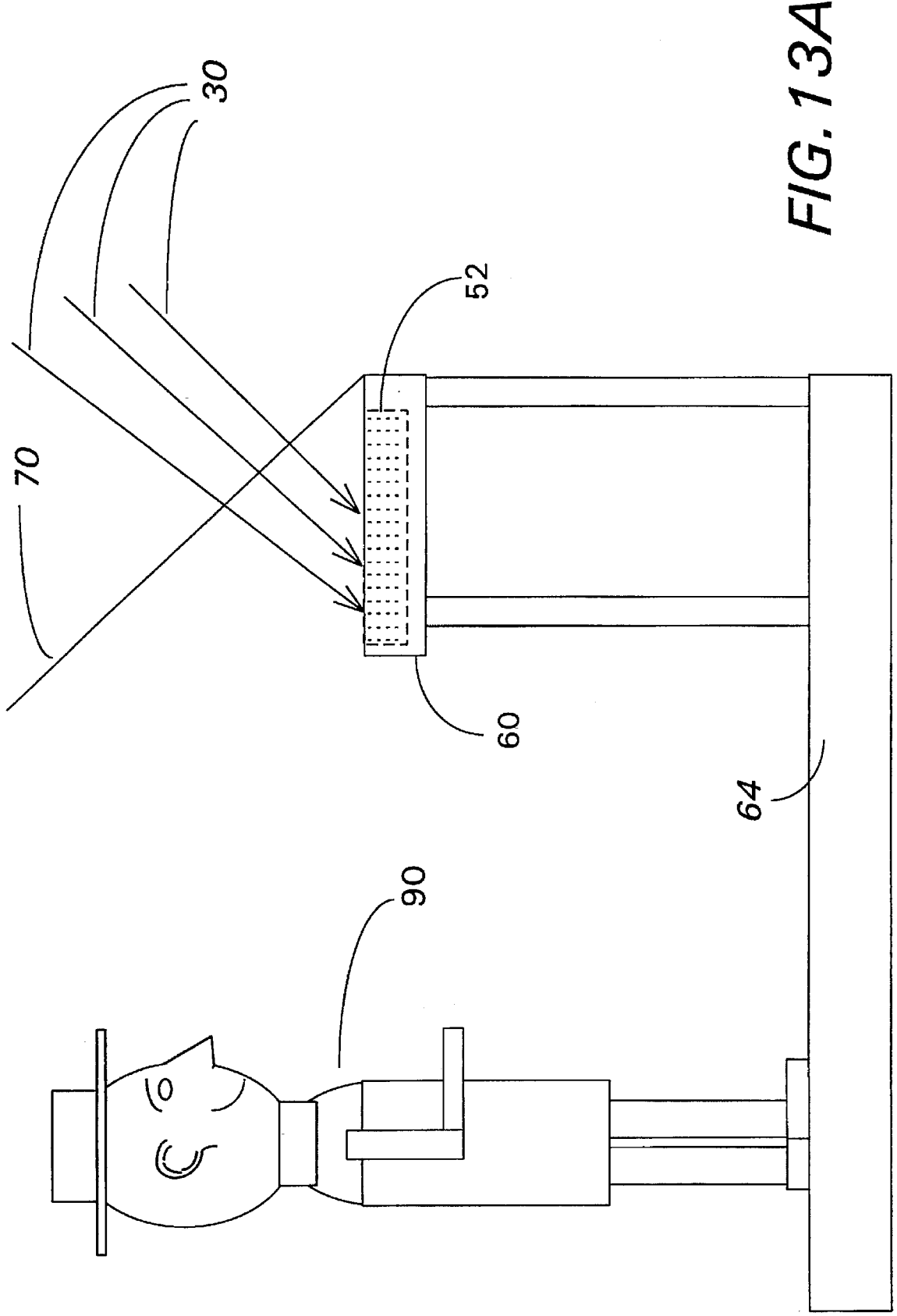

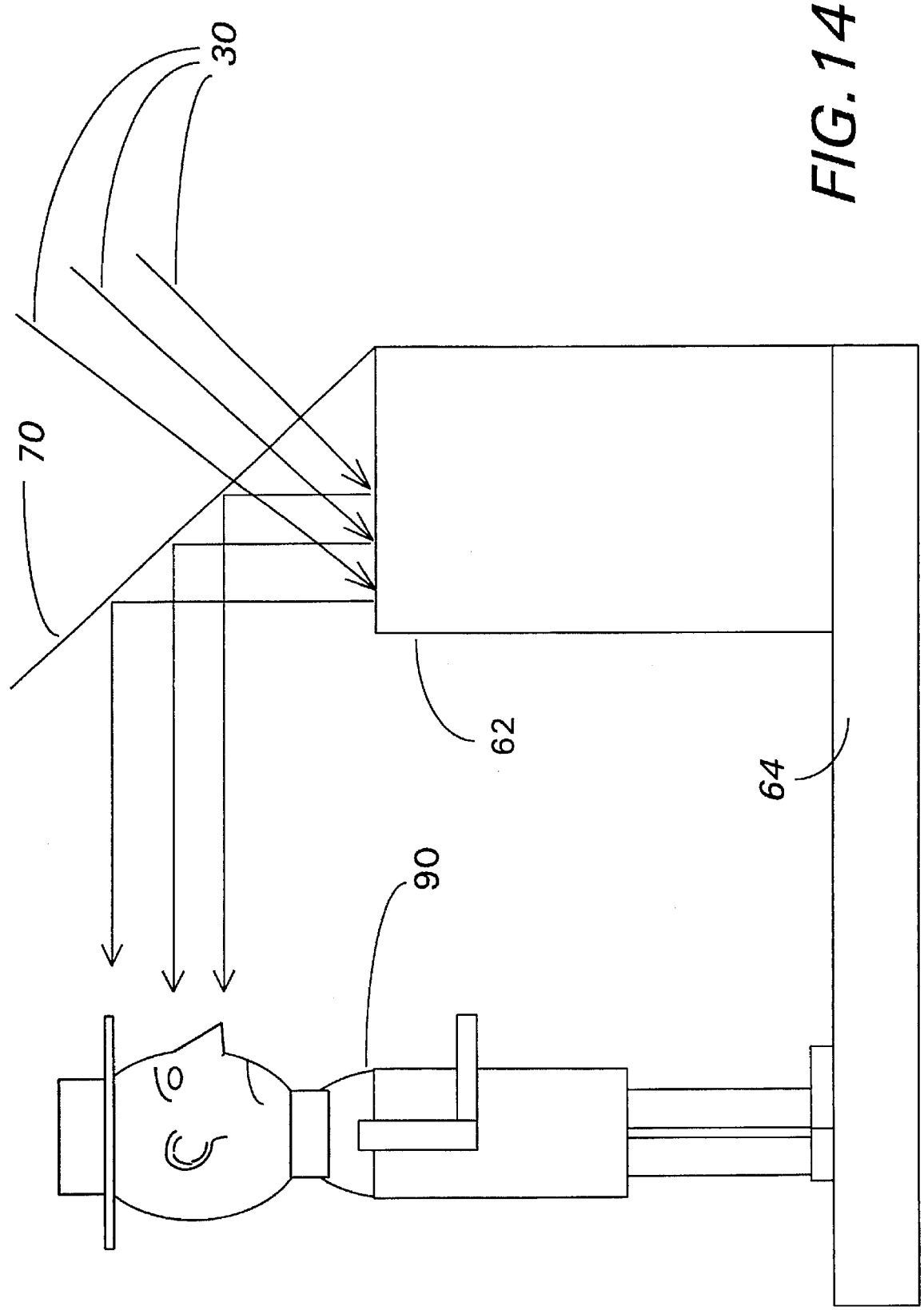

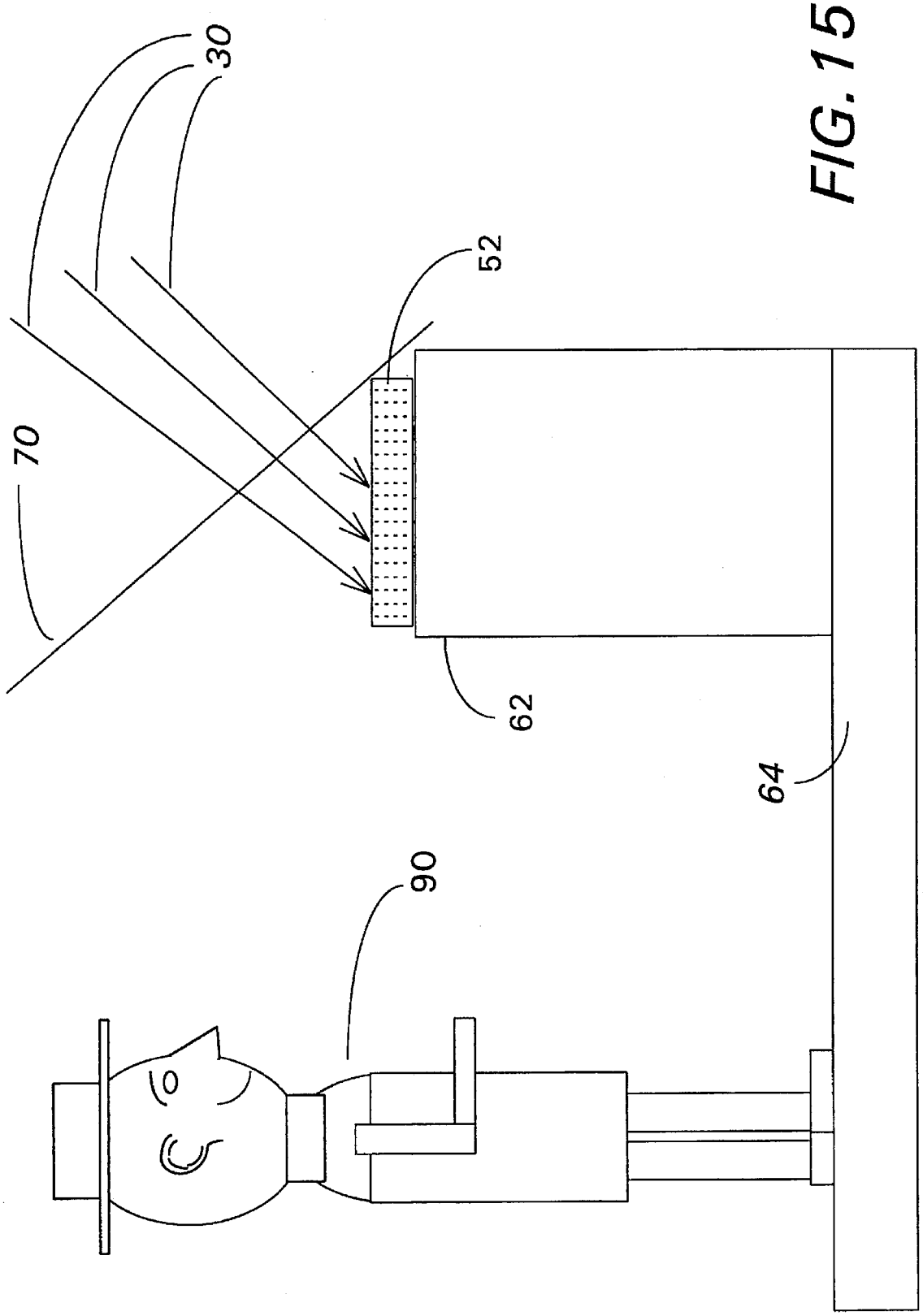

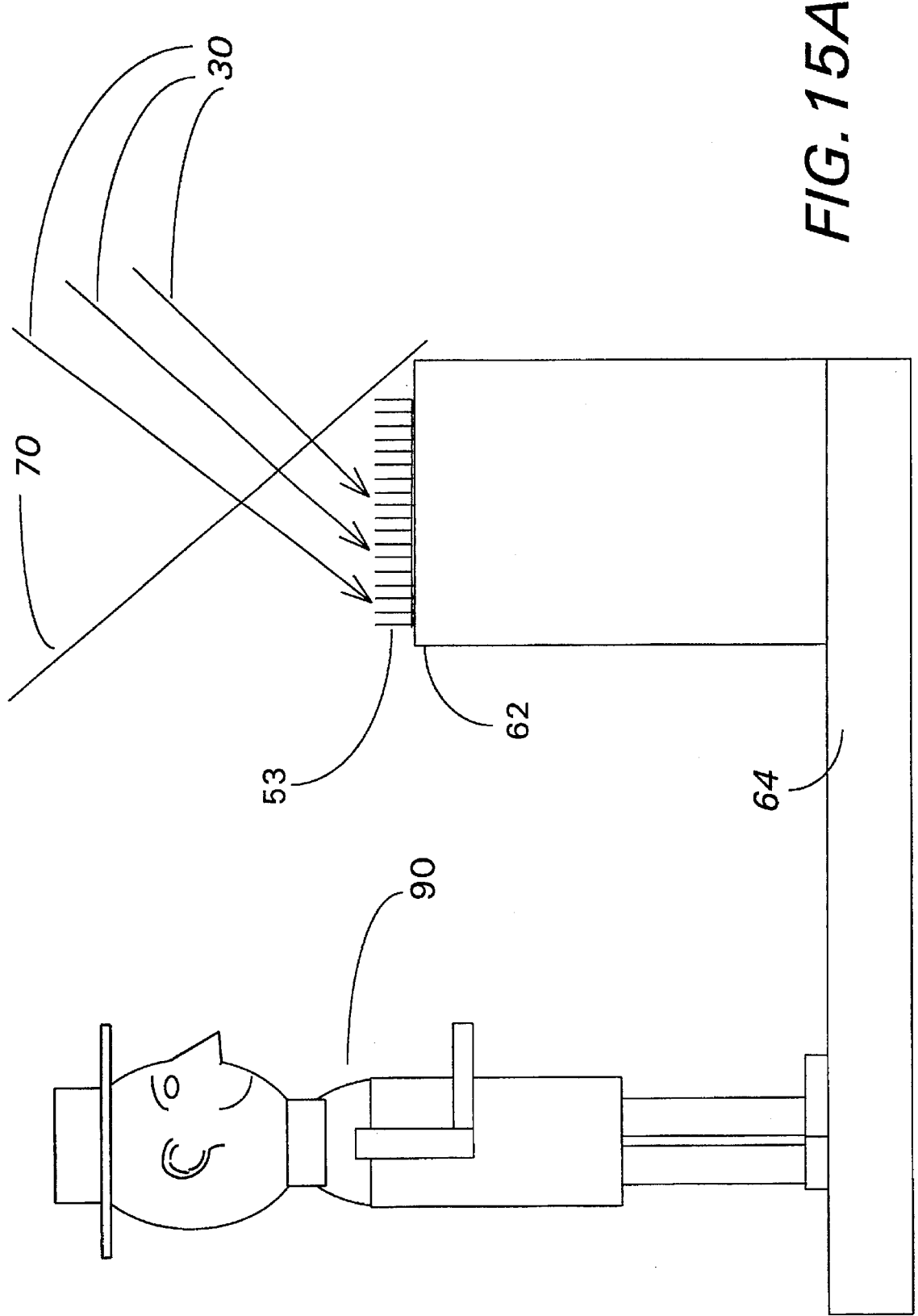

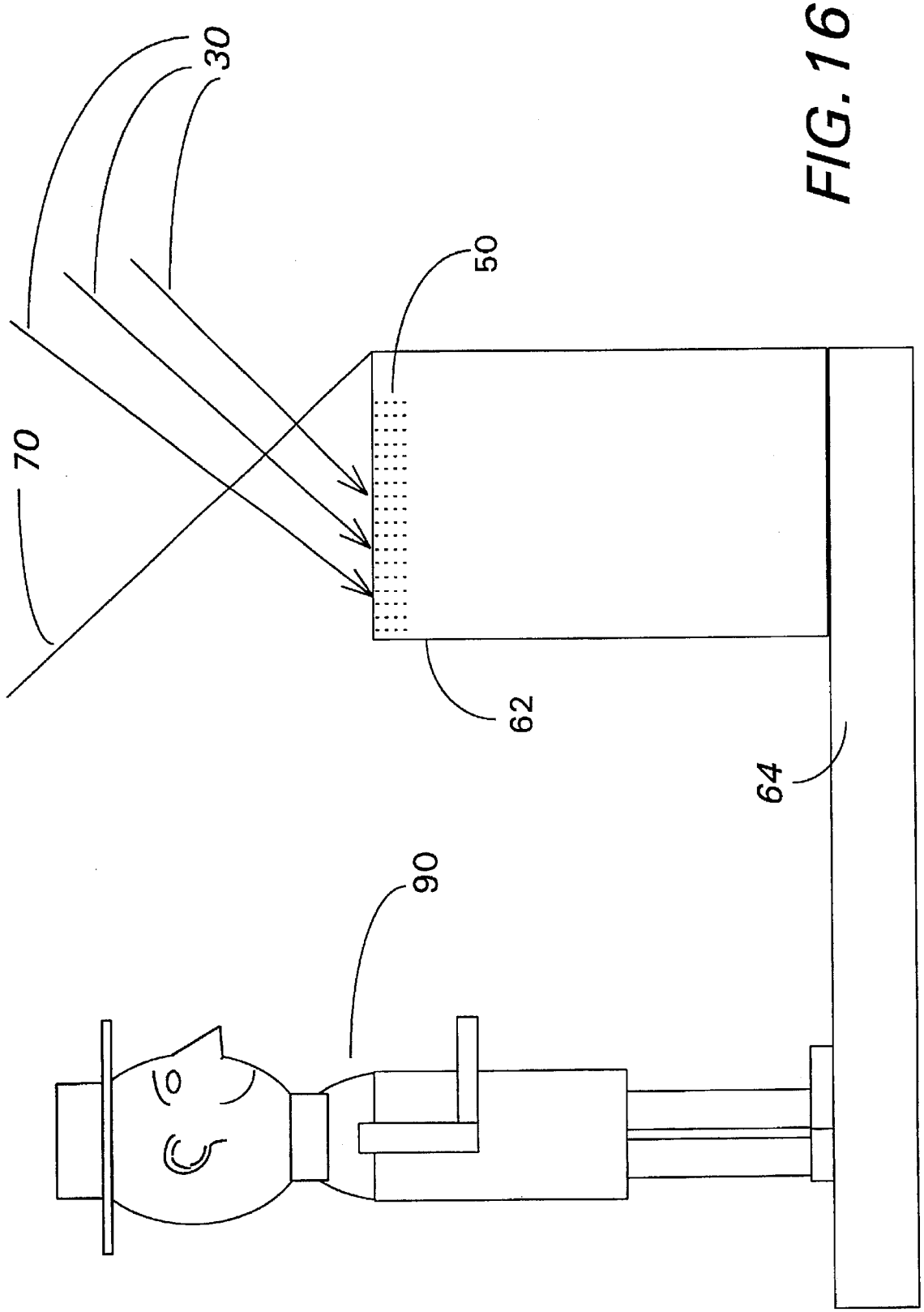

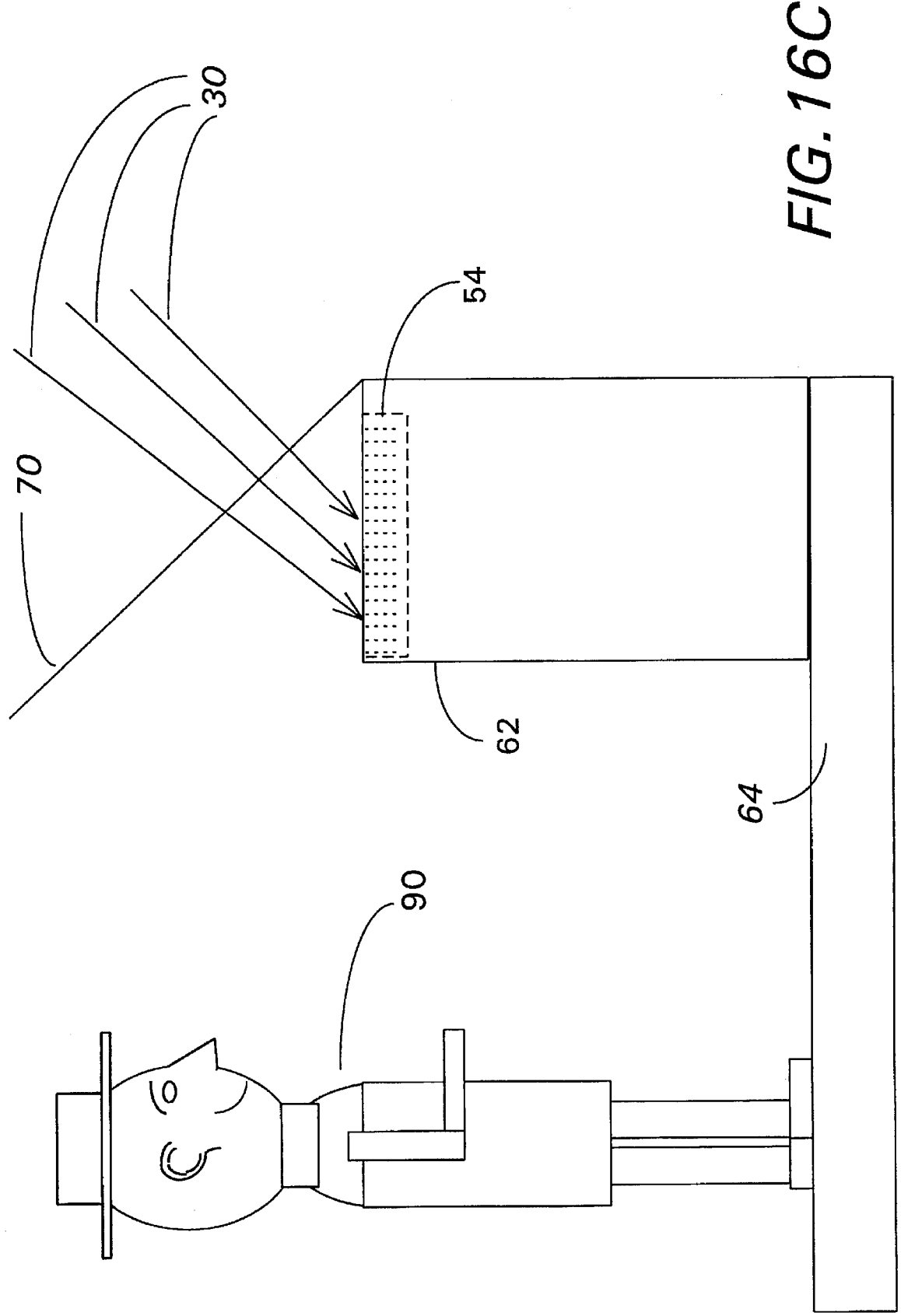

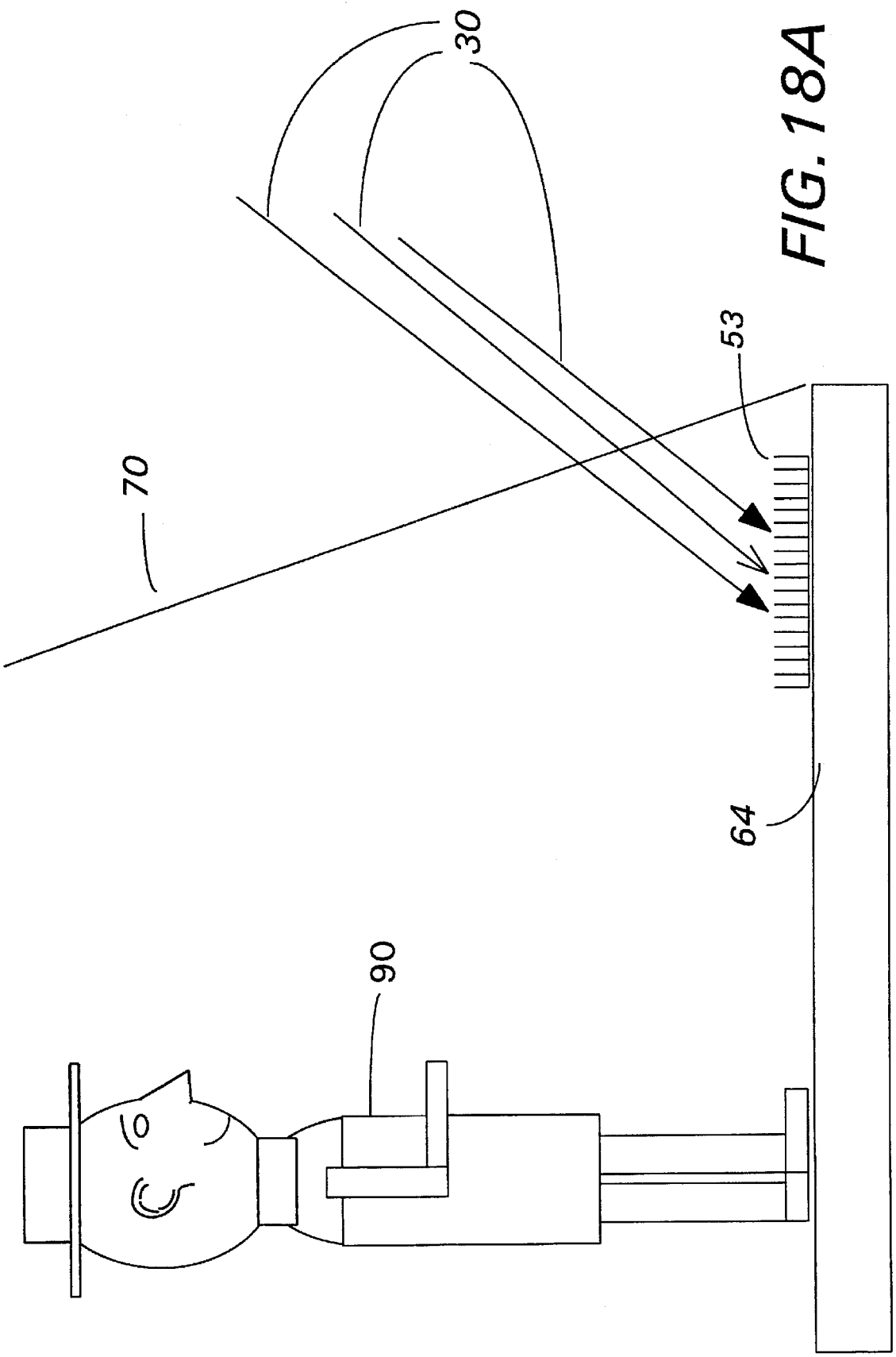

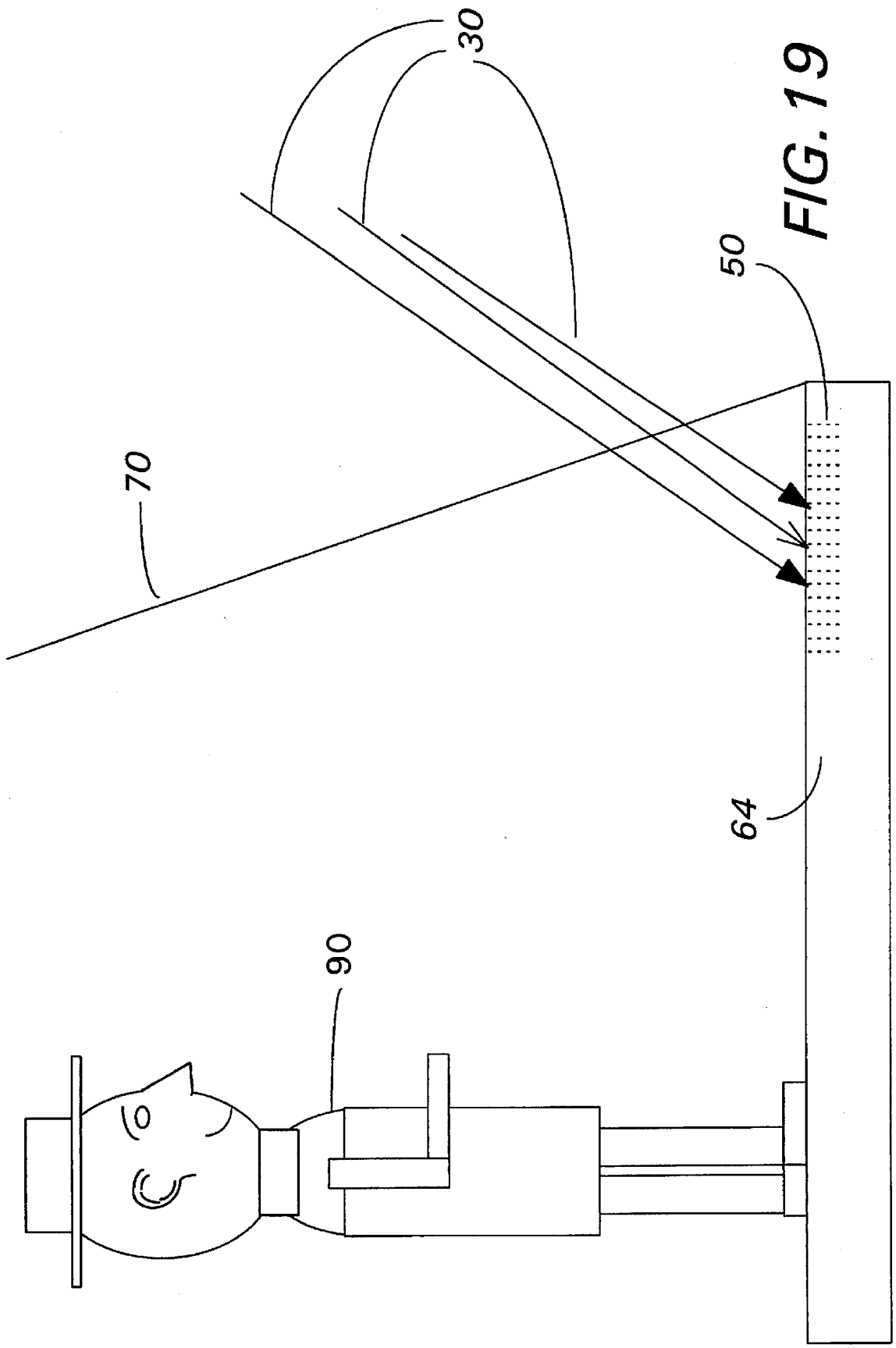

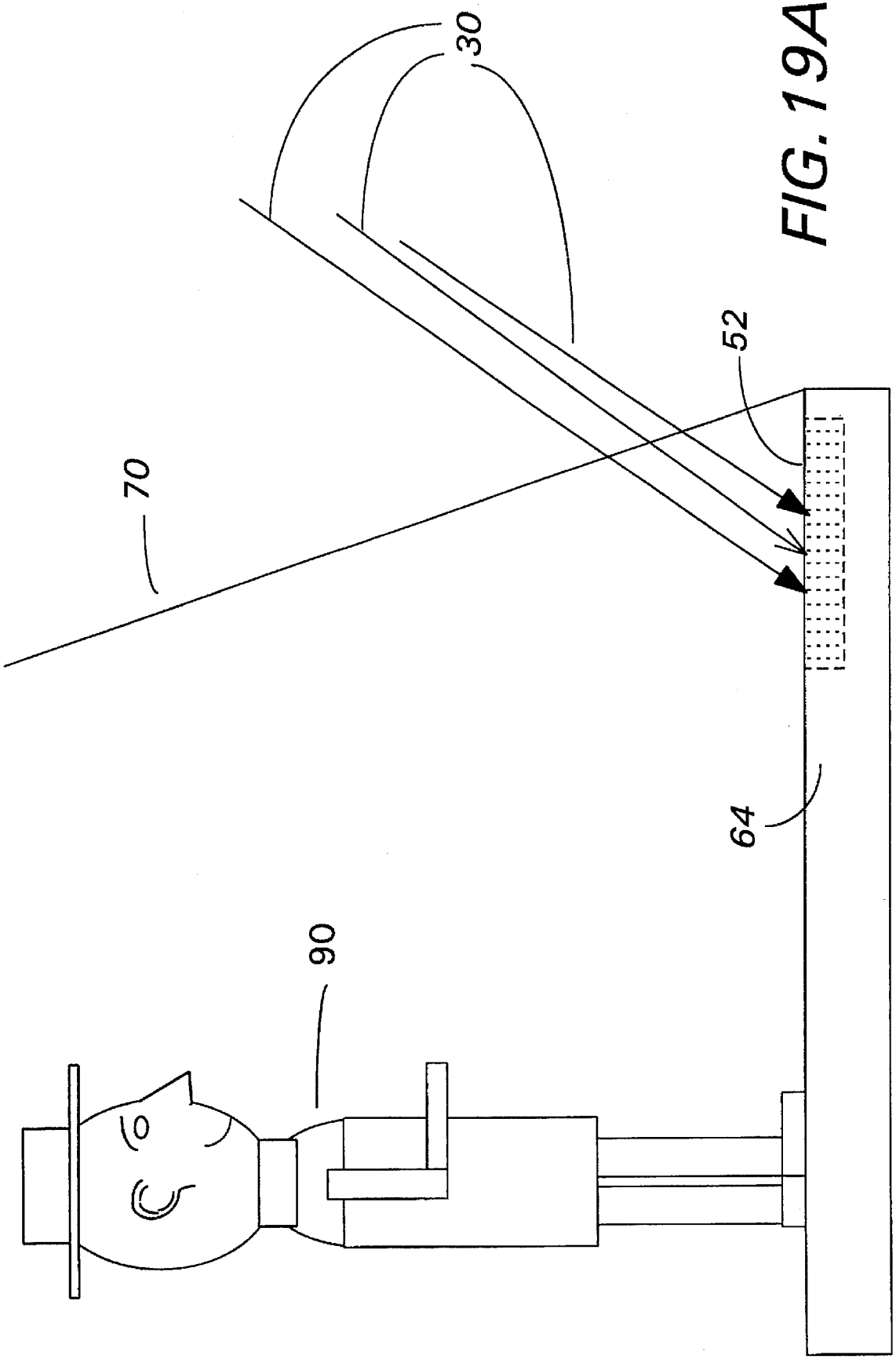

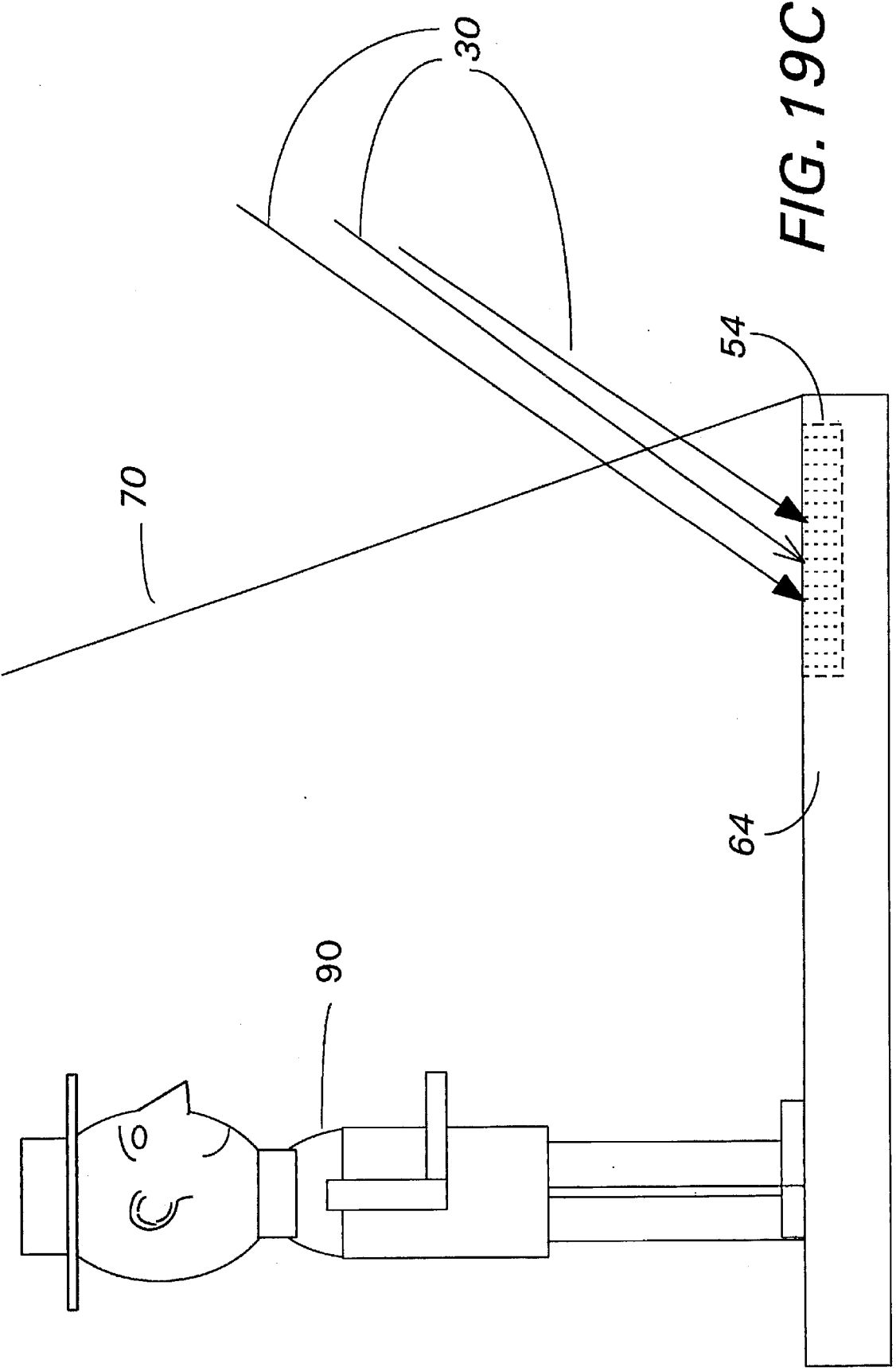

5,647,629

REFLECTION ELIMINATOR

BACKGROUND OF THE INVENTION

This invention relates to the reflection of light rays, specifically to the elimination of the reflection of light rays and the reflection of images resulting from light rays being reflected off material surfaces.

Most passenger automobiles are manufactured with fore windows 20A and aft windows 20D set at angles from vertical and most truck automobiles are manufactured with fore windows 20A set at angles from vertical. In each of most passenger and truck automobiles, immediately at or near the bottom of the fore window 20A is a surface at or near horizontal commonly called the top of the vehicle's instrument panel 20B. In each of most passenger automobiles, immediately at or near the bottom of the aft window 20D is a surface at or near horizontal known as a package tray 20C.

In all instances in which the fore windows 20A or aft windows 20D of vehicles are at angles away from vertical and some or all of the surfaces of the tops of the instrument panels 20B or package trays 20C are at horizontal or near horizontal, light rays 30 from natural sources and artificial sources enter the vehicles through the windows 20A and 20D are reflected off the tops of the instrument panels 20B and package trays 20C. These reflected light rays then travel in a vertical or near vertical direction and are then reflected off the insides of the fore windows 20A and aft windows 20D into the eyes of the vehicles' occupants 80. What the vehicles' occupants 80 see as a result of these reflections are reflected images of the tops of the instrument panels 20B and package trays 20C. These reflected images reduce visibility and cause eye strain for the vehicles' occupants 80.

Some buildings are constructed in such a manner that windows 70 are at angles from vertical. In all instances in which the windows 70 are at certain angles from vertical and some or all of the surfaces of the floors 64 or heat registers 62 or shelves 60 or other flat surfaces inside the structure are at horizontal or near horizontal, light rays from natural sources and artificial sources 30 enter the buildings through the windows 70 and are reflected off the tops of the floors 64 or heat registers 62 or shelves 60 or other flat surfaces. These reflected light rays then travel in a vertical or near vertical direction and are reflected off the insides of the windows 70 into the eyes of persons 90 viewing objects or scenes through the windows 70. A portion of what the building occupants 90 see as a result of these reflections are reflected images of the tops of the floors 64 or heat registers 62 or shelves 60 or other flat surfaces which exist inside the structure below the windows 70. These reflected images reduce visibility and cause eye strain for a person 90 inside the building viewing objects or scenes through the windows 70.

SUMMARY OF THE INVENTION

This invention 50, 52, 53 and 54 is an assembly or grouping of pieces of material in a configuration which results in the prevention of reflected light rays and reflected images. Said invention 50, 52, 53 and 54 can be of any size. The vertical members 10 are positioned vertically in the assembly or grouping of pieces of material and are located at intervals within the assembly or grouping of pieces of material which are less in distance than the height of said vertical members 10. A bottom 14 can be a part of the assembly or grouping of members in some configurations 53 and 54. Vertical support members 12 can be a part of this structure in some configurations 52 and 54.

The reflection eliminator 52, 53 and 54 can be fabricated from a single piece of material.

The reflection eliminator 52, 53 and 54 can be manufactured as a unit to be placed below a window 20A on top of an instrument panel 20B, on the top of a package tray 20C below a window 20D or on a floor 64 or on a heat register 62 or on a shelf 60 or other flat surface below a window 70. It can also be manufactured into and be an integral part of any vehicle's instrument panel 20B, an integral part of any vehicle's package tray 20C, or an integral part of a building's heat register 62 or shelf 60 or floor 64 or other flat surface.

DRAWING FIGURES

FIG. 2A is a perspective view of the reflection eliminator 52 with vertical members and with vertical support members and without a bottom.

Figure 1A:
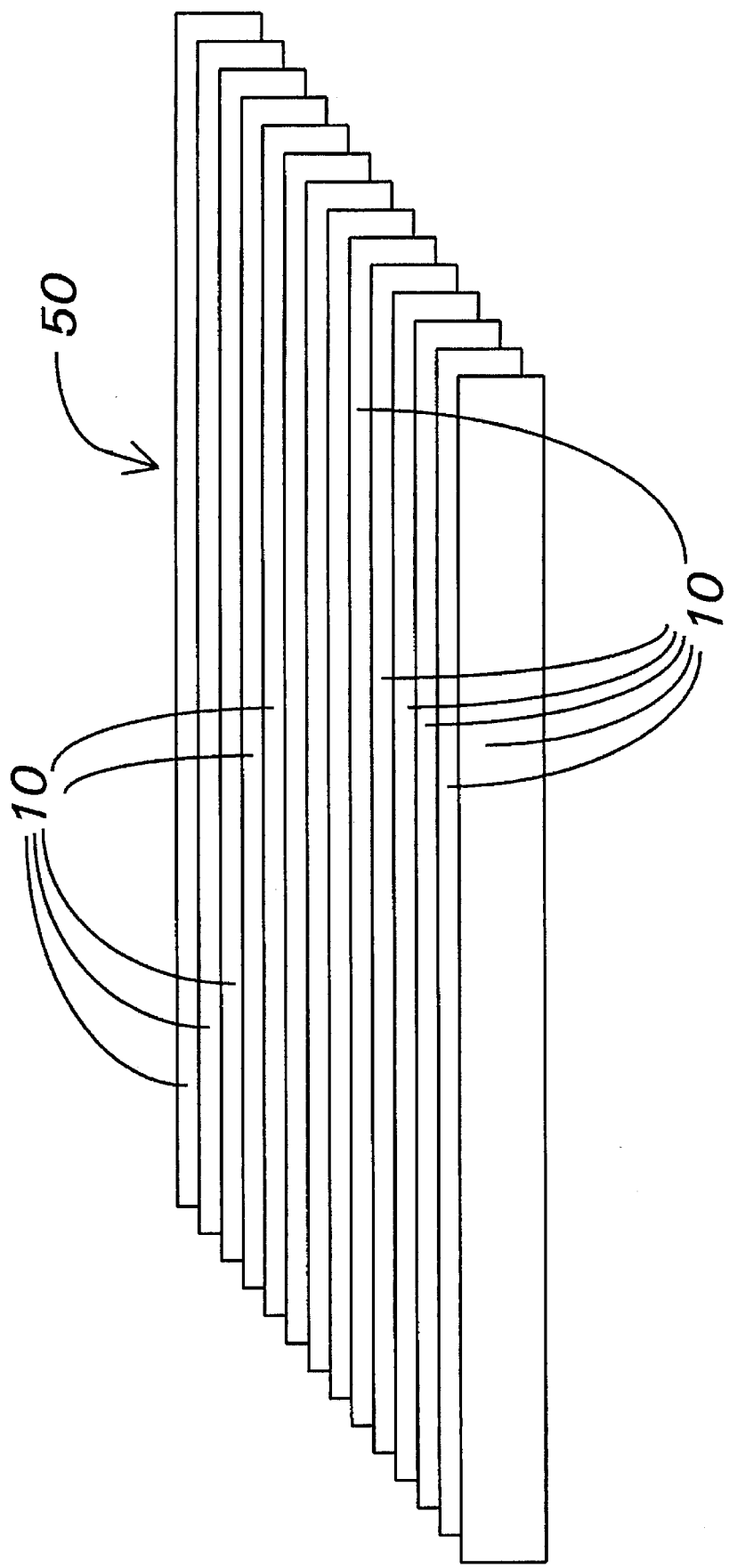
FIG. 1A is a perspective view of the reflection eliminator 50 with vertical members and without vertical support members and without a bottom.
Figure 3A:
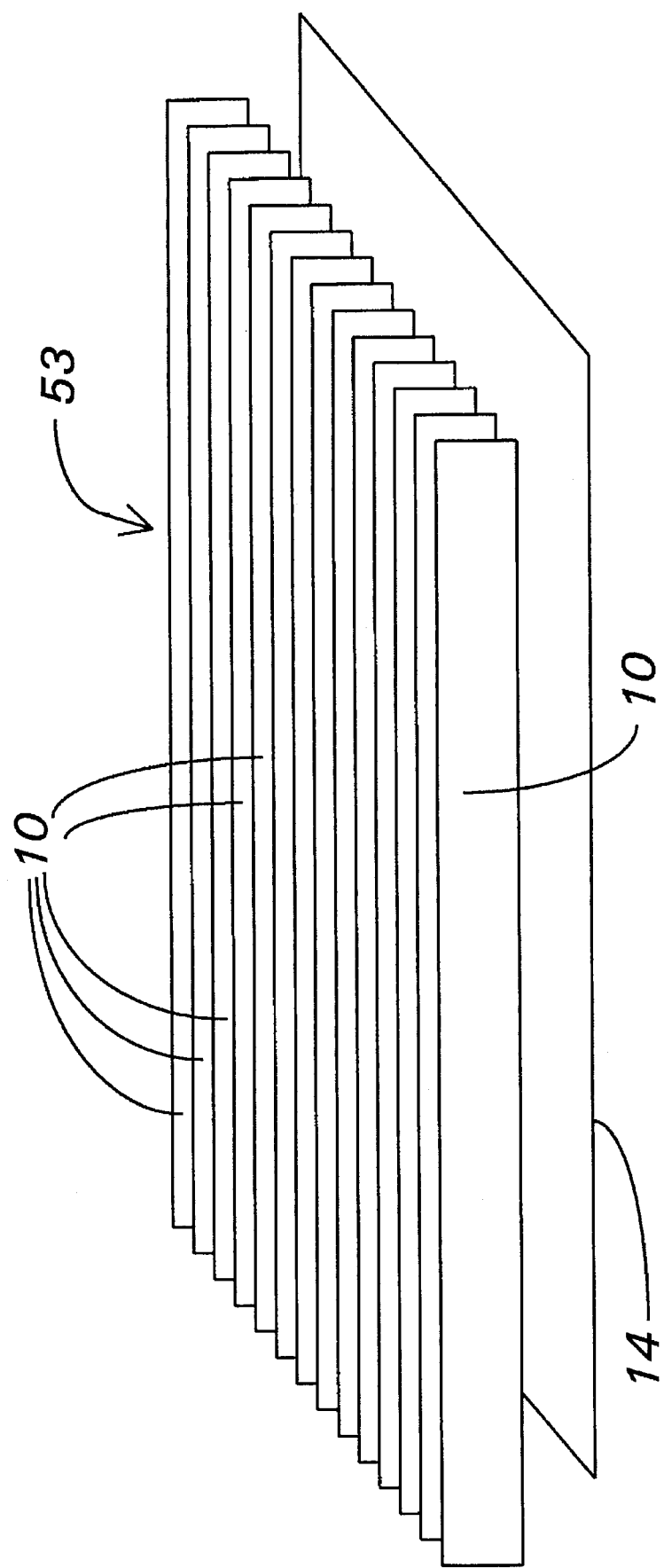
FIG. 3A is an exploded view in the perspective of the reflection eliminator 53 with vertical members and with a bottom and without vertical support members.
Figure 4A:
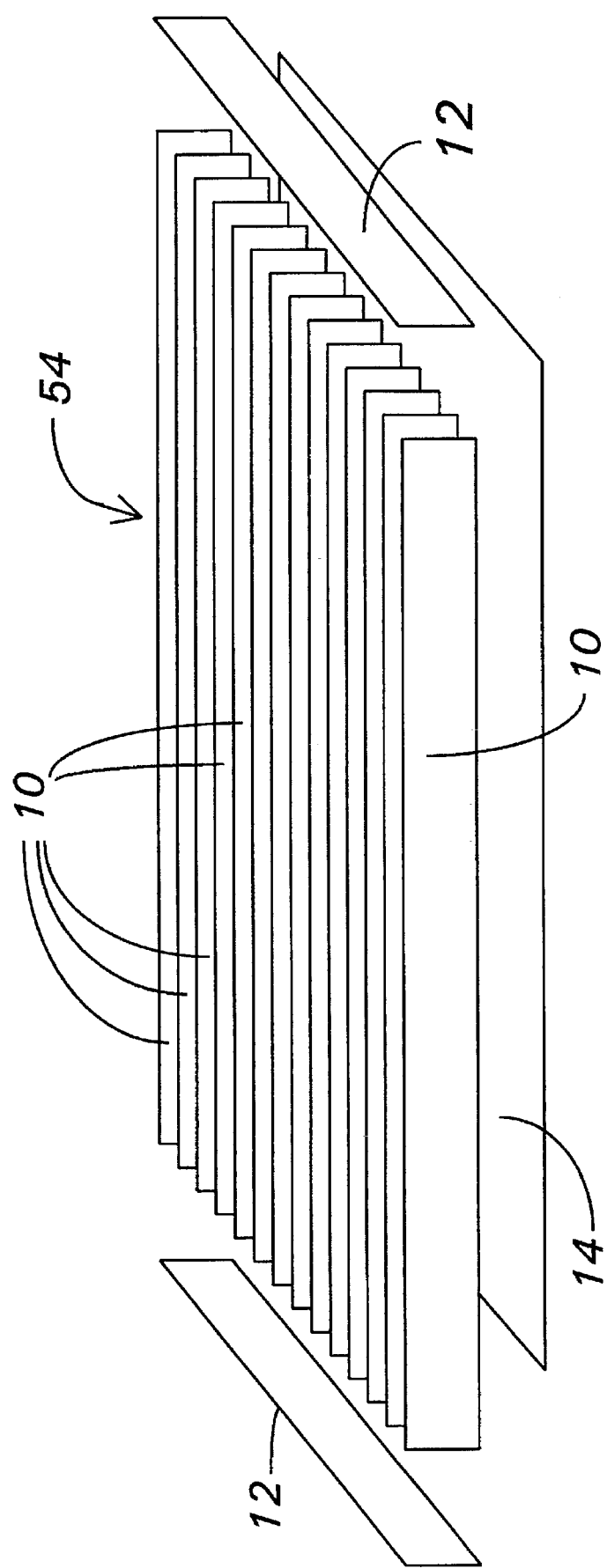
FIG. 4A is an exploded view in the perspective of the reflection eliminator 54 with vertical members and with vertical support members and with a bottom.

FIG. 5 is a drawing of the side view of a fore portion of a passenger or truck automobile showing the vehicle occupant 80, the top of the vehicle's instrument panel 20B, the vehicle's front window 20A, and the direction, travel and reflection of light rays 30 indicated by arrows when the reflection eliminator 50, 52, 53 or 54 is not in use.

FIG. 6 is a drawing of the side view of a fore portion of a passenger or truck automobile showing the reflection eliminator 50 as an integral part of the vehicle, an occupant of the vehicle 80, the top of the vehicle's instrument panel 20B, the vehicle's front window 20A and the direction and travel of light rays 30 indicated by arrows.

FIG. 6A is a drawing of the side view of a fore portion of a passenger or truck automobile showing the reflection eliminator 52 as an integral part of the vehicle, an occupant of the vehicle 80, the top of the vehicle's instrument panel 20B, the vehicle's front window 20A and the direction and travel of light rays 30 indicated by arrows.

Figure 6B:
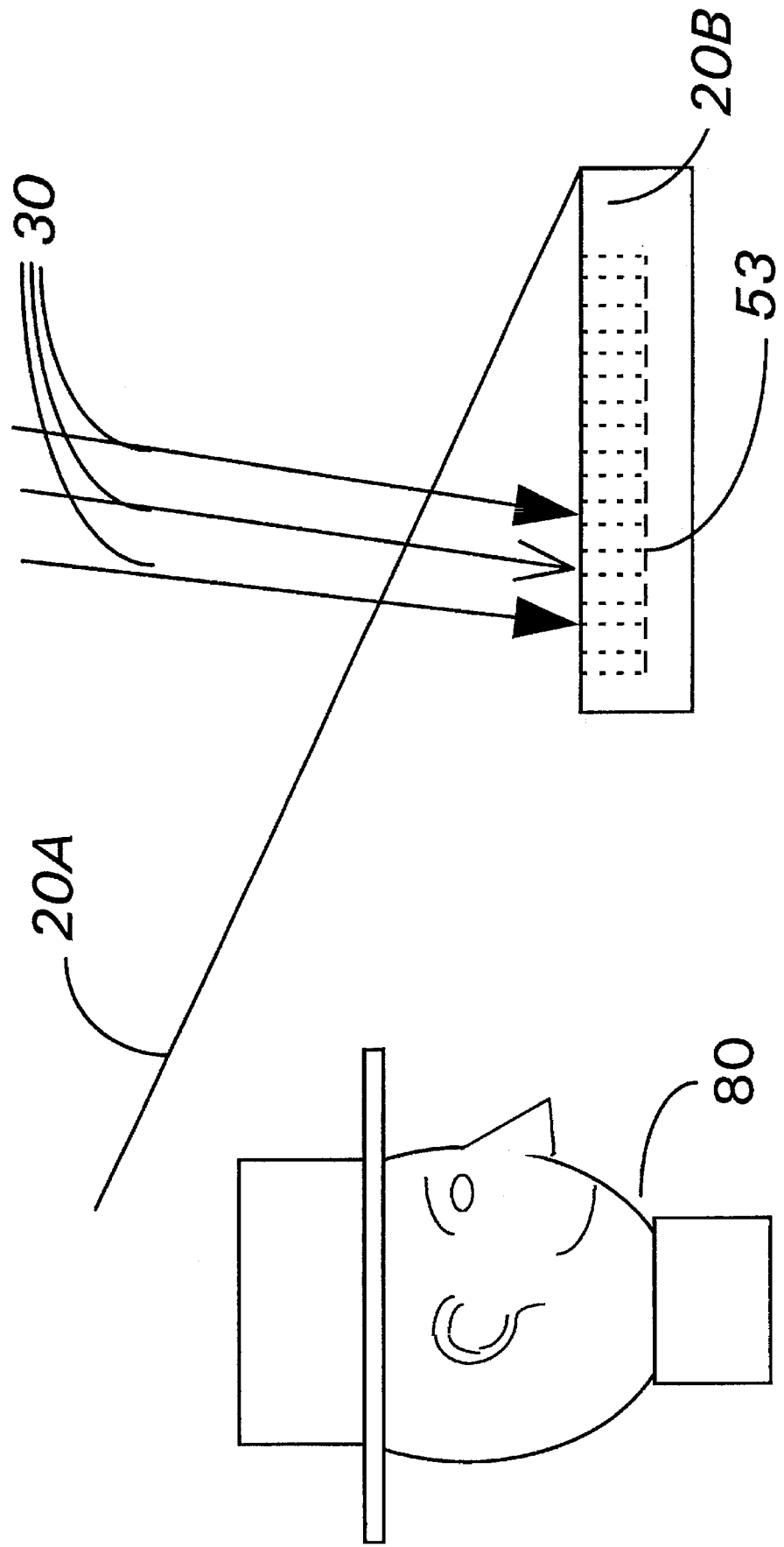

FIG. 6B is a drawing of the side view of a fore portion of a passenger or truck automobile showing the reflection eliminator 53 as an integral part of the vehicle, an occupant of the vehicle 80, the top of the vehicle's instrument panel 20B, the vehicle's front window 20A and the direction and travel of light rays 30 indicated by arrows.

Figure 6C:
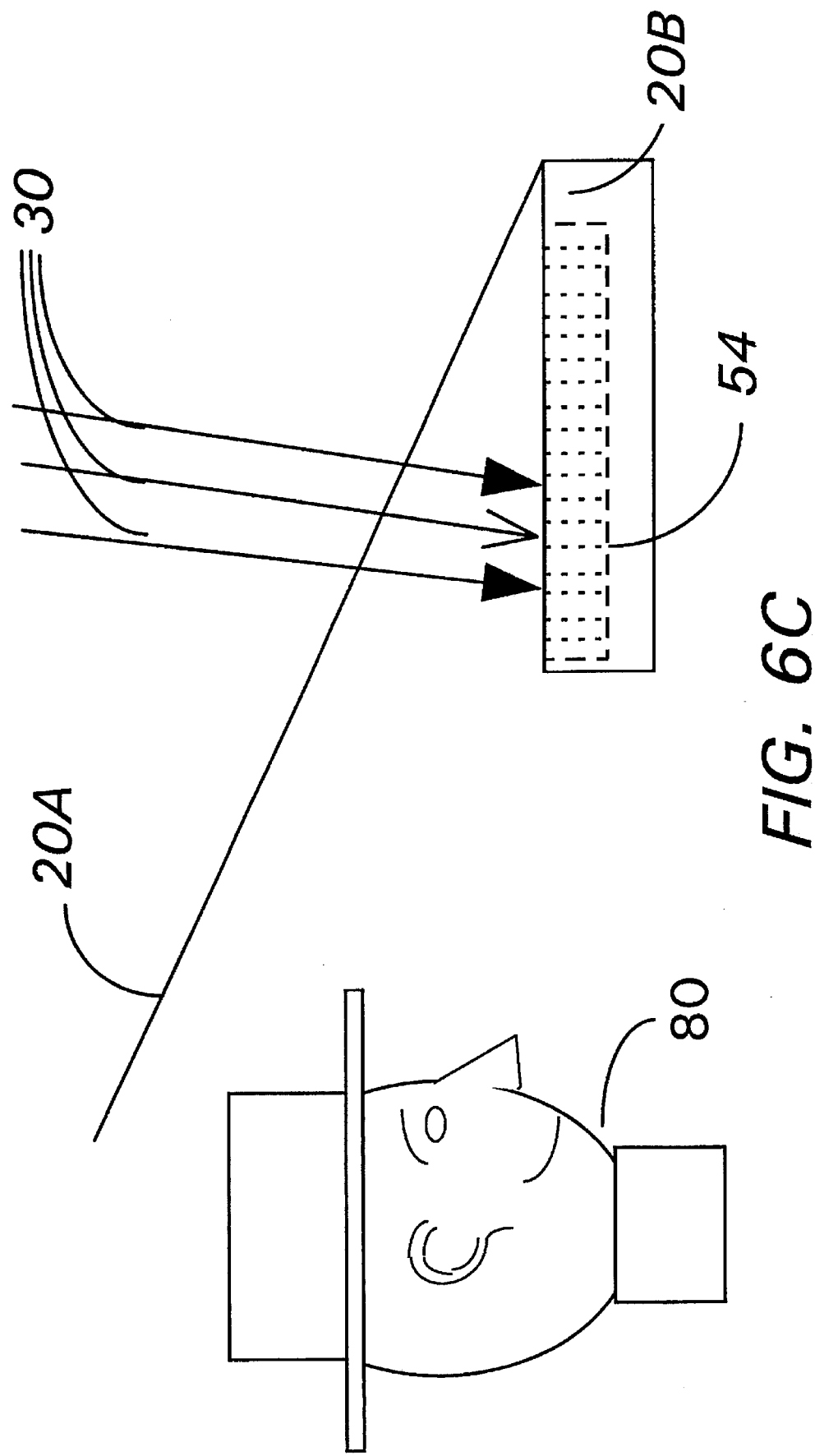

FIG. 6C is a drawing of the side view of a fore portion of a passenger or truck automobile showing the reflection eliminator 54 as an integral part of the vehicle, an occupant of the vehicle 80, the top of the vehicle's instrument panel 20B, the vehicle's front window 20A and the direction and travel of light rays 30 indicated by arrows.

FIG. 7 is a drawing of the side view of a fore portion of a passenger or truck automobile showing the reflection eliminator 52 as a separate item located on the top of the vehicle's instrument panel 20B and showing an occupant of the vehicle 80, the top of the vehicle's instrument panel 20B, the vehicle's front window 20A and the direction and travel of light rays 30 indicated by arrows.

FIG. 7A is a drawing of the side view of a fore portion of a passenger or truck automobile showing the reflection eliminator 53 as a separate item located on the top of the vehicle's instrument panel 20B and showing an occupant of the vehicle 80, the top of the vehicle's instrument panel 20B, the vehicle's front window 20A and the direction and travel of light rays 30 indicated by arrows.

Figure 7B:
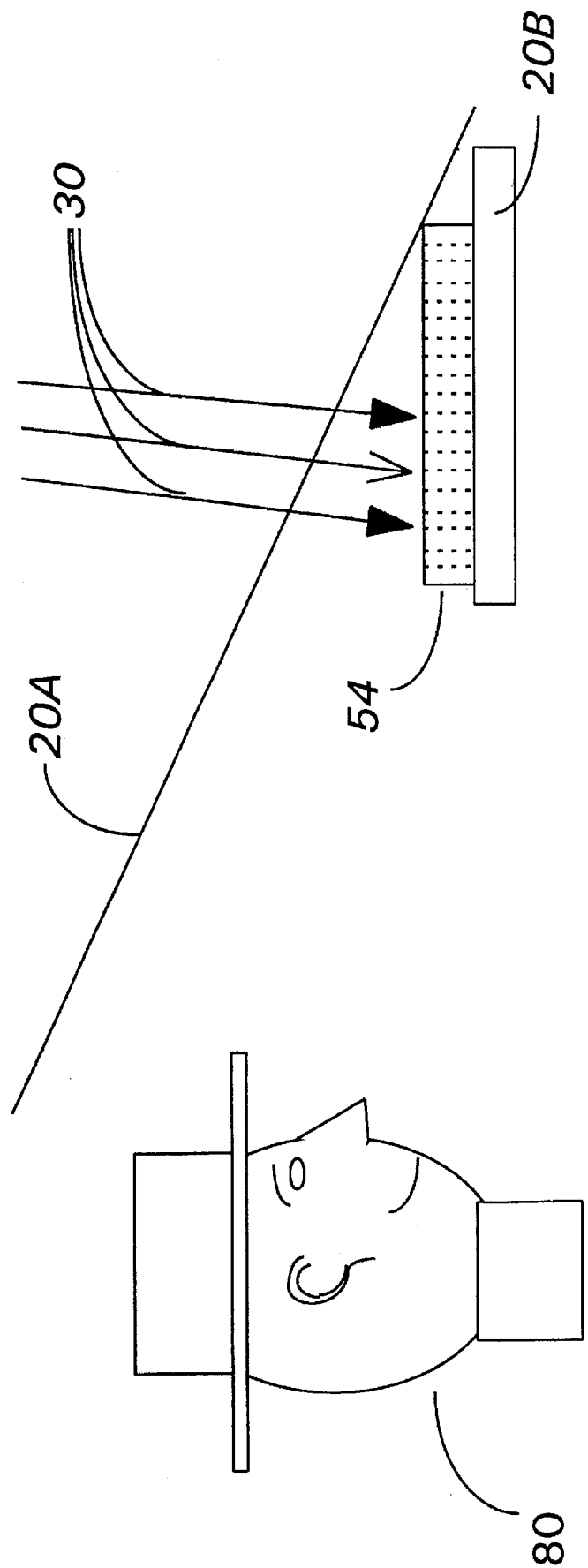

FIG. 7B is a drawing of the side view of a fore portion of a passenger or truck automobile showing the reflection eliminator 54 as a separate item located on the top of the vehicle's instrument panel 20B and showing an occupant of the vehicle 80, the top of the vehicle's instrument panel 20B, the vehicle's front window 20A and the direction and travel of light rays 30 indicated by arrows.

Figure 8:
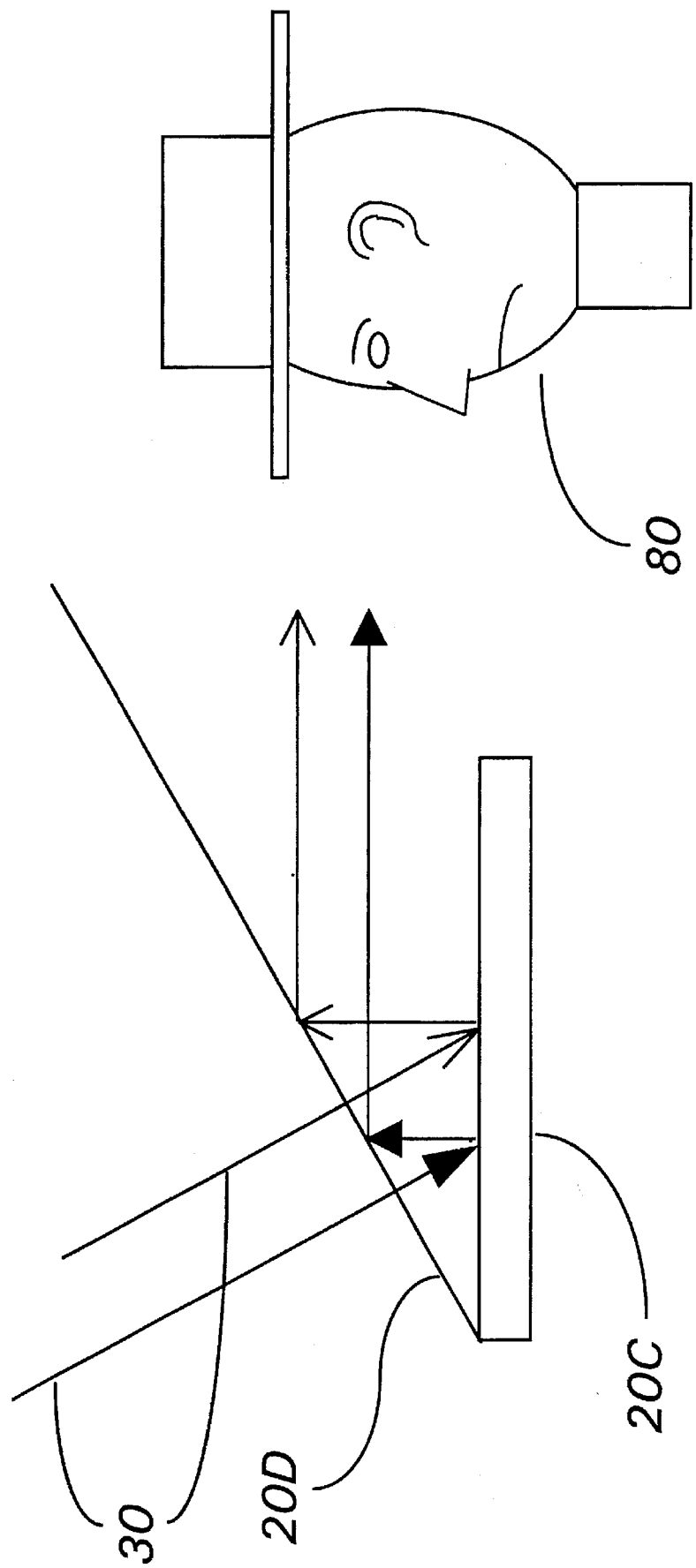

FIG. 8 is a drawing of the side view of an aft portion of a passenger automobile showing the vehicle occupant 80, the top of the vehicle's package tray 20C, the vehicle's aft window 20D, and the direction, travel and reflection of light rays 30 indicated by arrows when the reflection eliminator 50, 52, 53 or 54 is not in use.

Figure 9:
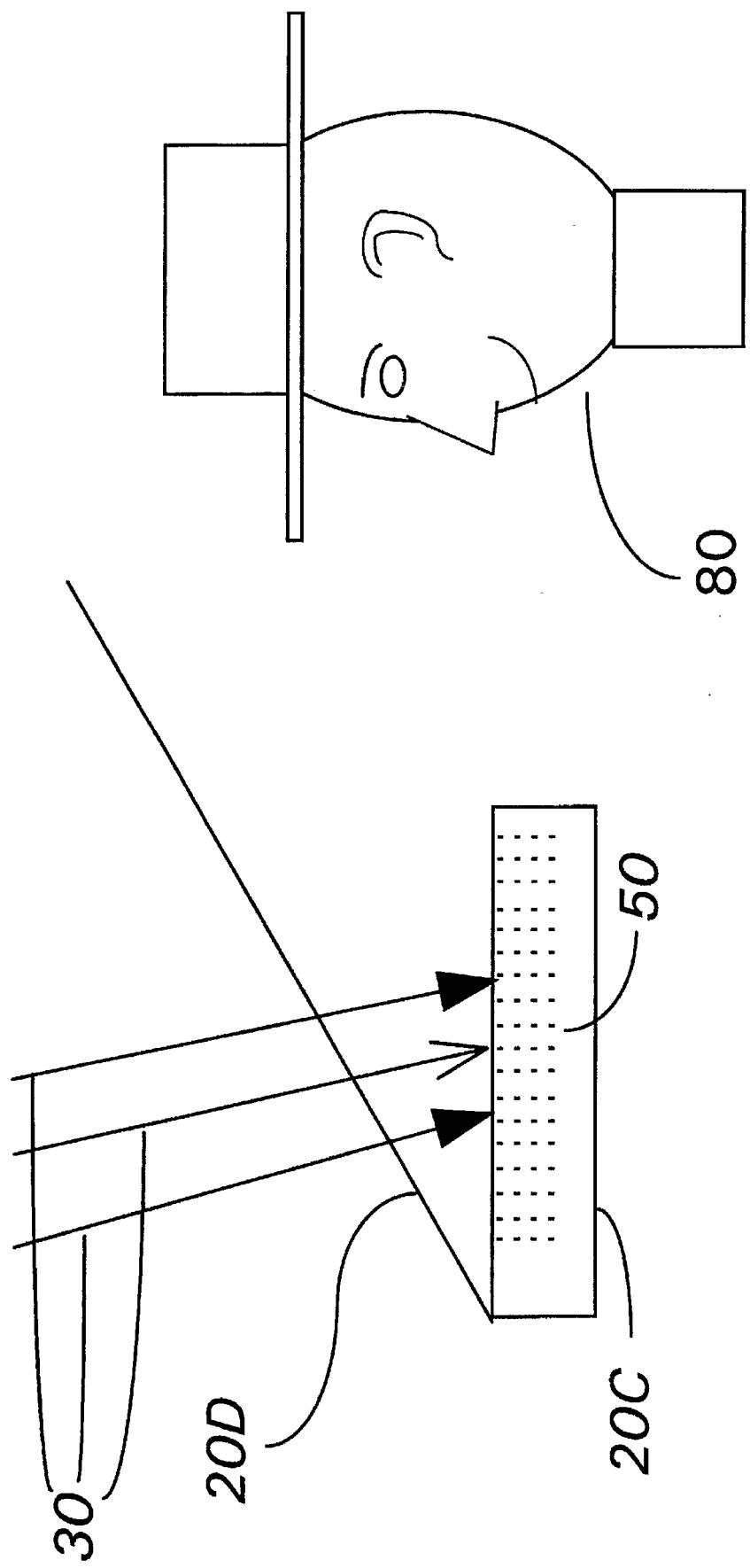

FIG. 9 is a drawing of the side view of an aft portion of a passenger automobile showing the reflection eliminator 50 as an integral part of the vehicle, showing the vehicle occupant 80, the top of the vehicle's package tray 20C, the vehicle's aft window 20D, and the direction and travel of light rays 30 indicated by arrows.

Figure 9A:
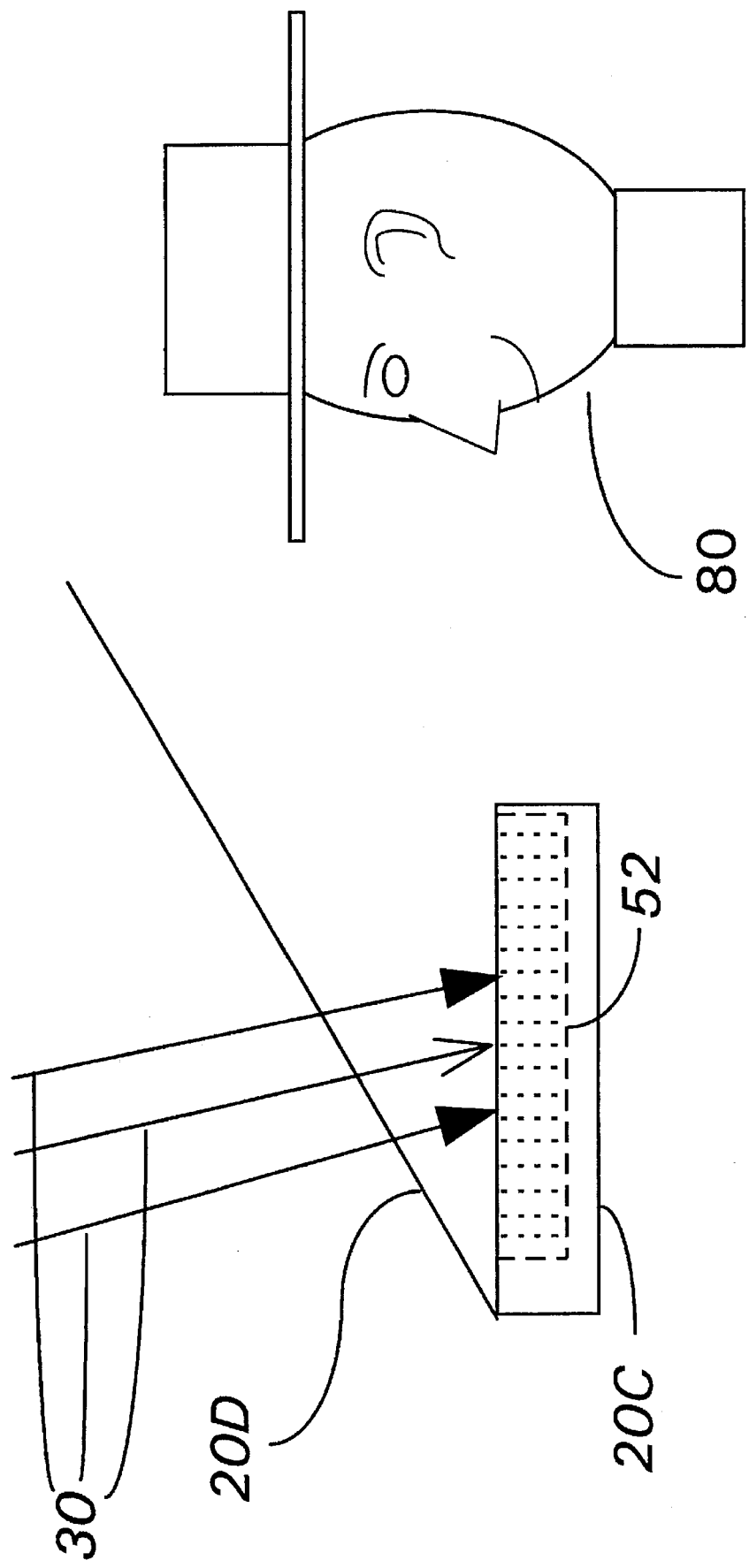

FIG. 9A is a drawing of the side view of an aft portion of a passenger automobile showing the reflection eliminator 52 as an integral part of the vehicle, showing the vehicle occupant 80, the top of the vehicle's package tray 20C, the vehicle's aft window 20D, and the direction and travel of light rays 30 indicated by arrows.

FIG. 9B is a drawing of the side view of an aft portion of a passenger automobile showing the reflection eliminator 53 as an integral part of the vehicle, showing the vehicle occupant 80, the top of the vehicle's package tray 20C, the vehicle's aft window 20D, and the direction and travel of light rays 30 indicated by arrows.

Figure 9C:
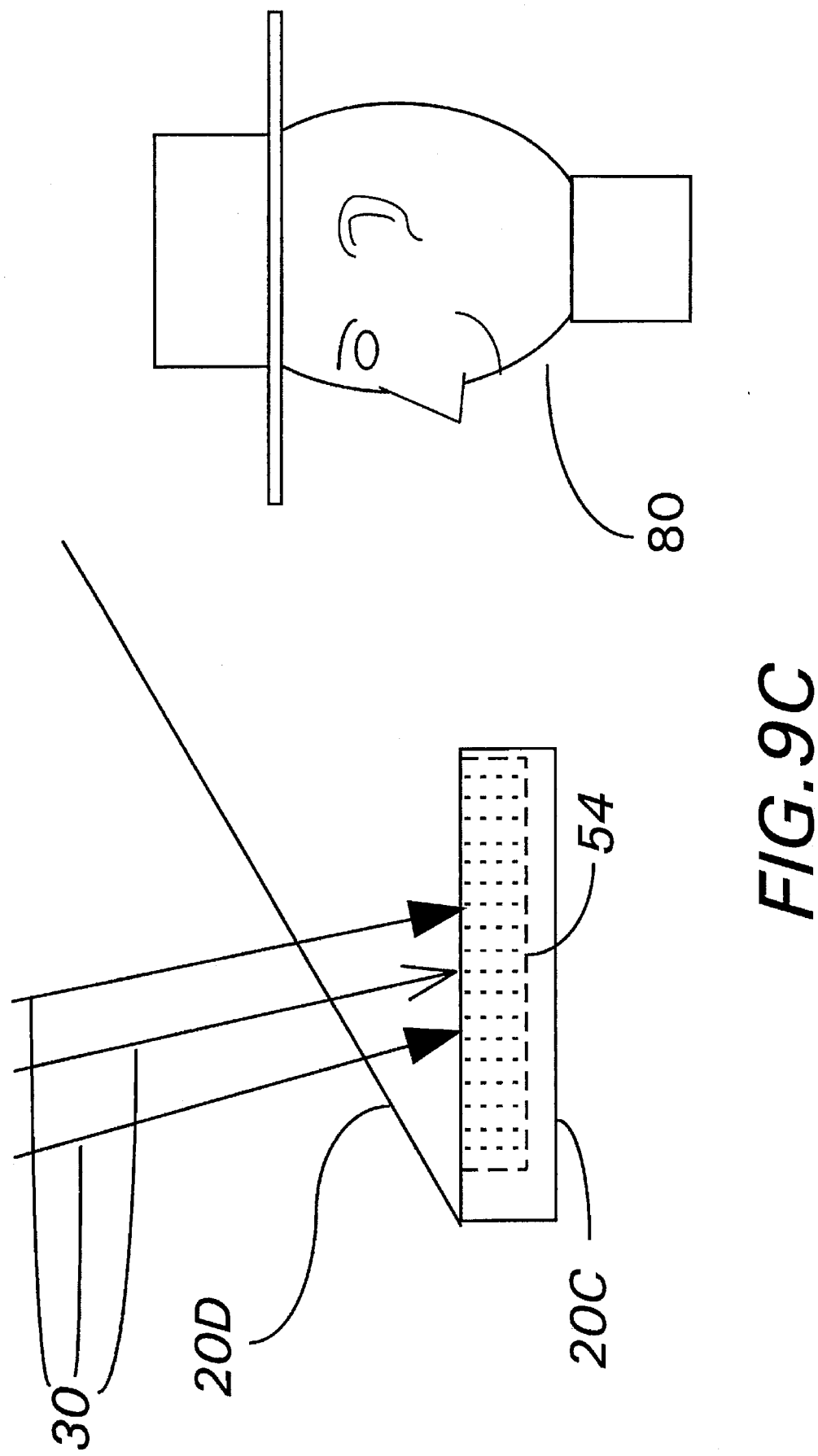

FIG. 9C is a drawing of the side view of an aft portion of a passenger automobile showing the reflection eliminator 54 as an integral part of the vehicle, showing the vehicle occupant 80, the top of the vehicle's package tray 20C, the vehicle's aft window 20D, and the direction and travel of light rays 30 indicated by arrows.

FIG. 10 is a drawing of the side view of an aft portion of a passenger automobile showing the reflection eliminator 52 as a separate item located on the top of the vehicle's package tray 20C, showing the vehicle occupant 80, the top of the vehicle's package tray 20C, the vehicle's aft window 20D, and the direction and travel of light rays 30 indicated by arrows.

Figure 10A:
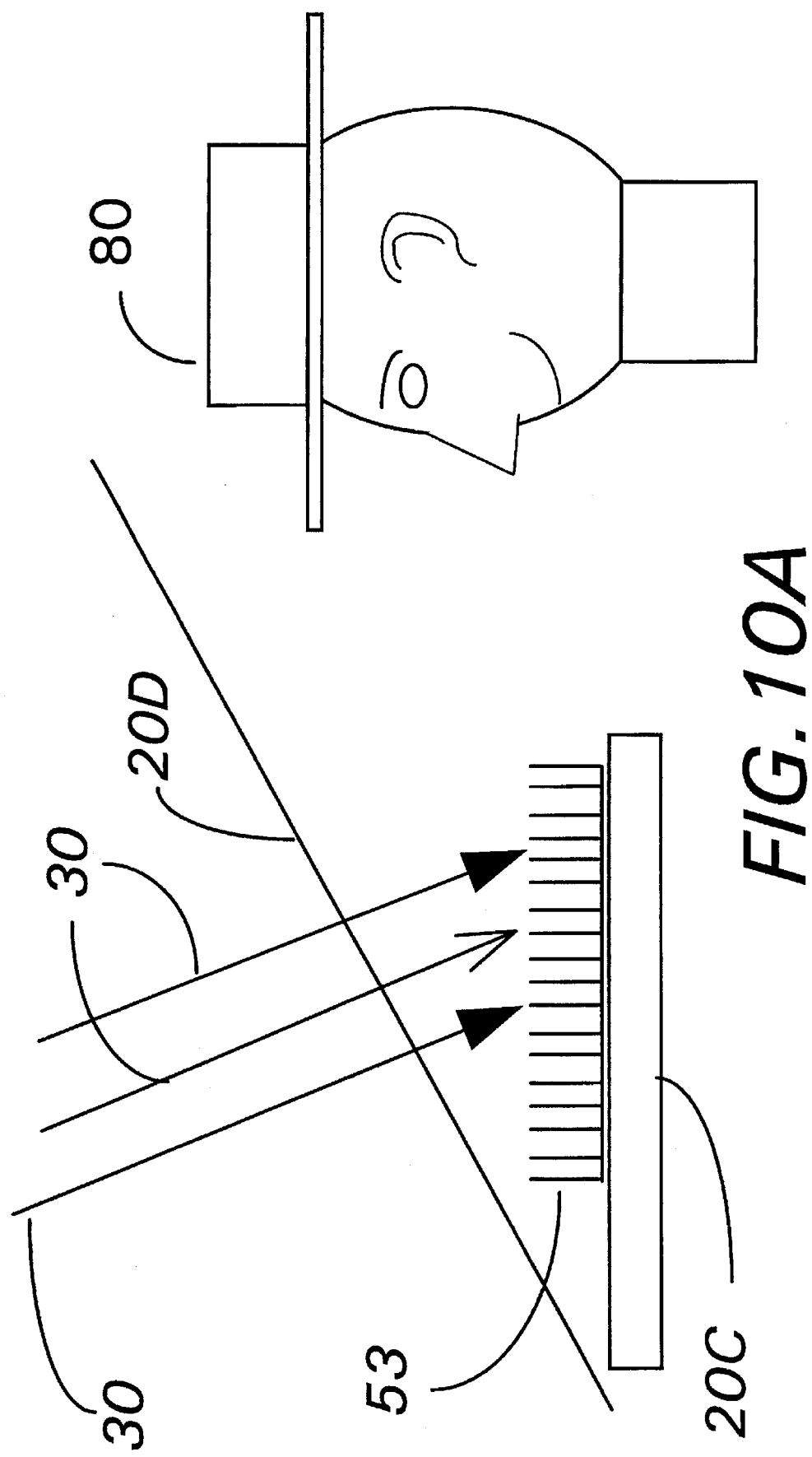

FIG. 10A is a drawing of the side view of an aft portion of a passenger automobile showing the reflection eliminator 53 as a separate item located on the top of the vehicle's package tray 20C, showing the vehicle occupant 80, the top of the vehicle's package tray 20C, the vehicle's aft window 20D, and the direction and travel of light rays 30 indicated by arrows.

Figure 10B:
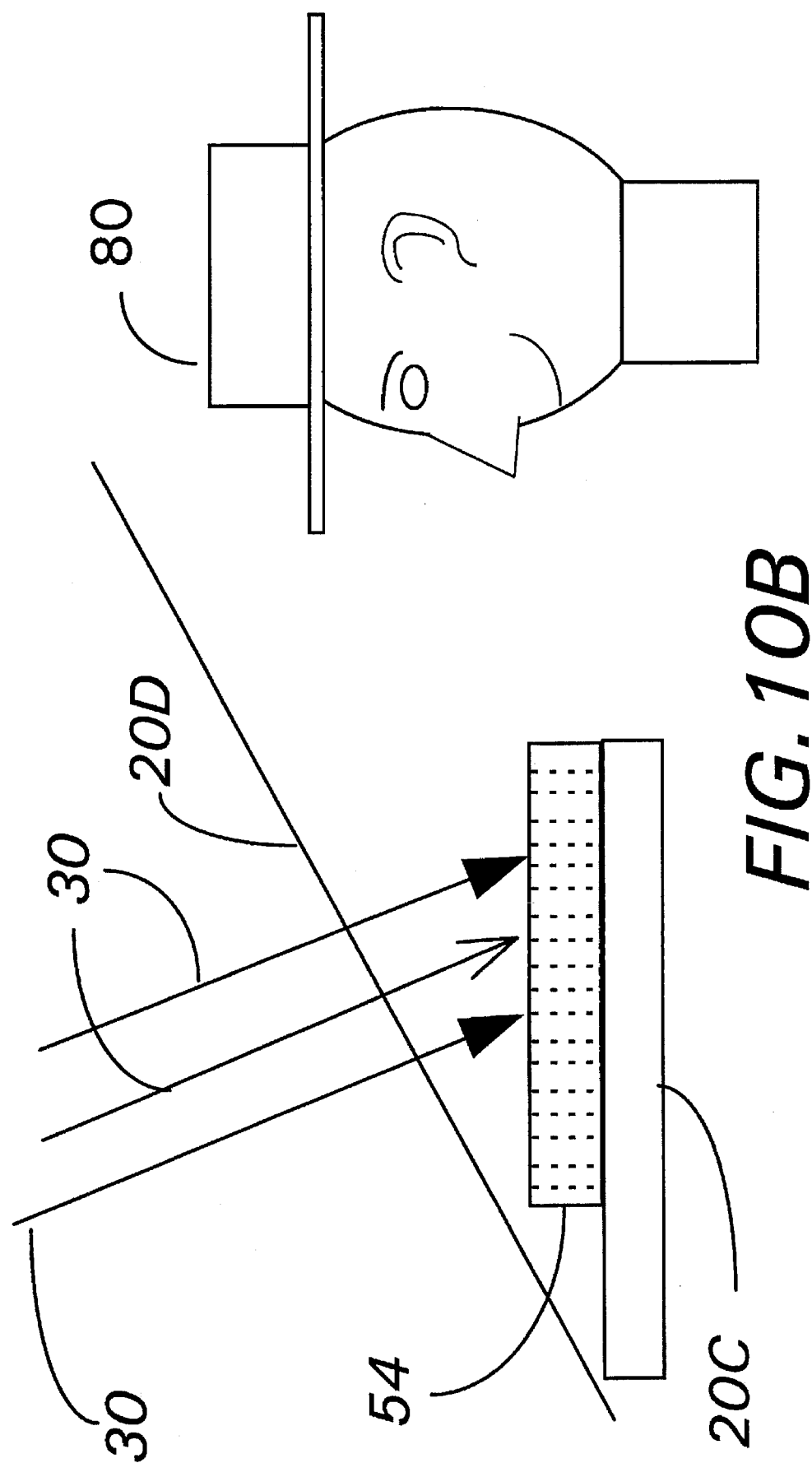

FIG. 10B is a drawing of the side view of an aft portion of a passenger automobile showing the reflection eliminator 54 as a separate item located on the top of the vehicle's package tray 20C, showing the vehicle occupant 80, the top of the vehicle's package tray 20C, the vehicle's aft window 20D, and the direction and travel of light rays 30 indicated by arrows.

FIG. 11 is a drawing of the side view of a portion of a building showing a shelf 60, a floor 64, a window 70, a person 90 and light rays 30 and showing the direction, travel and reflection of light rays 30 indicated by arrows when the reflection eliminator 50, 52, 53 or 54 is not in use.

FIG. 12 is a drawing of the side view of a portion of a building showing the reflection eliminator 52 located as a separate item on the top of a shelf 60 and showing a person 90, a floor 64, a window 70 and light rays 30 the direction and travel of which are indicated by arrows.

Figure 12A:
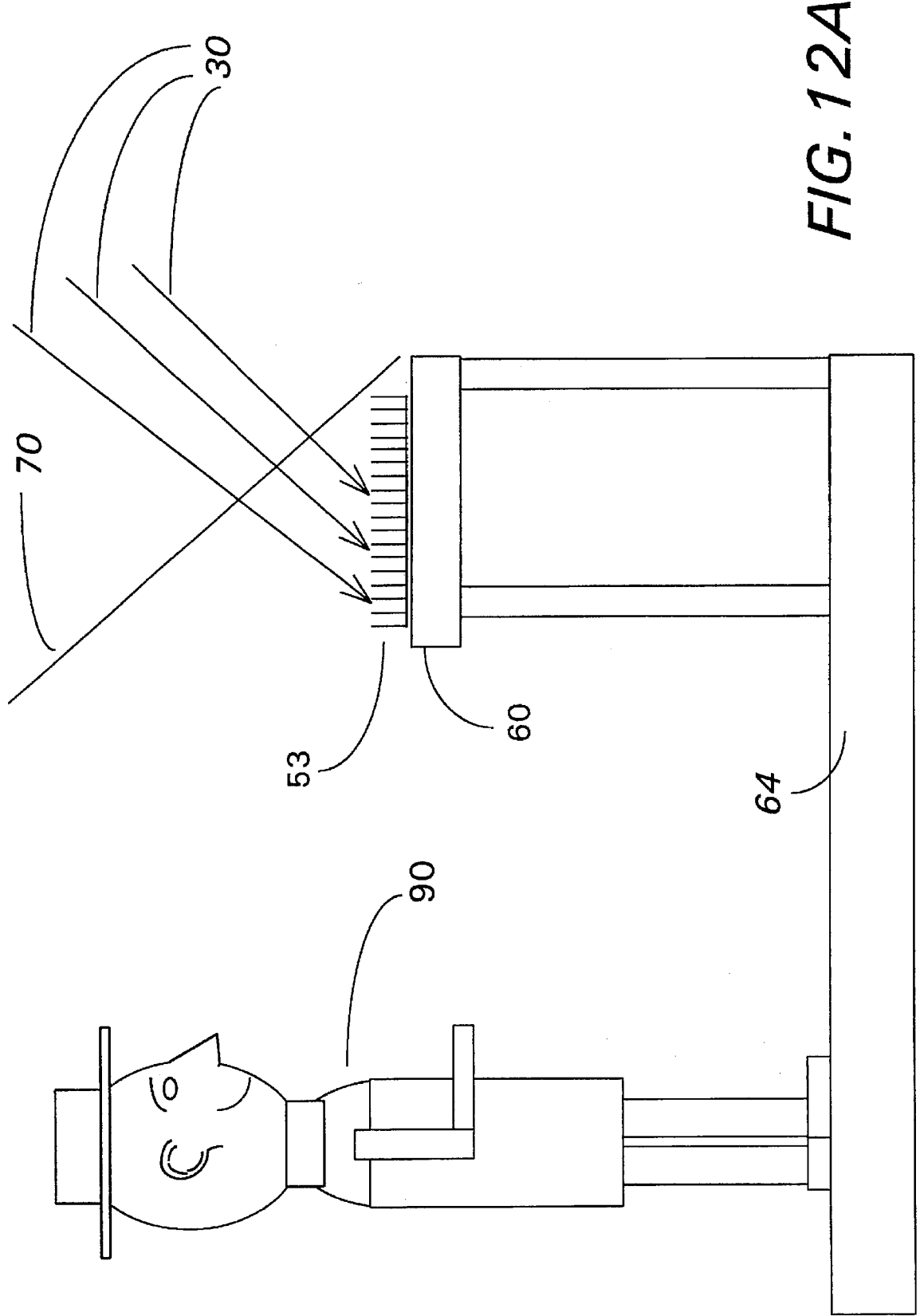

FIG. 12A is a drawing of the side view of a portion of a building showing the reflection eliminator 53 located as a separate item on the top of a shelf 60 and showing a person 90, a floor 64, a window 70 and light rays 30 the direction and travel of which are indicated by arrows.

FIG. 12B is a drawing of the side view of a portion of a building showing the reflection eliminator 54 located as a separate item on the top of a shelf 60 and showing a person 90, a floor 64, a window 70 and light rays 30 the direction and travel of which are indicated by arrows.

FIG. 13 is a drawing of the side view of a portion of a building the reflection eliminator 50 located within the shelf 60 as an integral part of said shelf 60 and showing a person 90, a floor 64, a window 70 and light rays 30 the direction and travel of which are indicated by arrows.

FIG. 13A is a drawing of the side view of a portion of a building showing the reflection eliminator 52 located within the shelf 60 as an integral part of said shelf 60 and showing a person 90, a floor 64, a window 70 and light rays 30 the direction and travel of which are indicated by arrows.

Figure 13B:
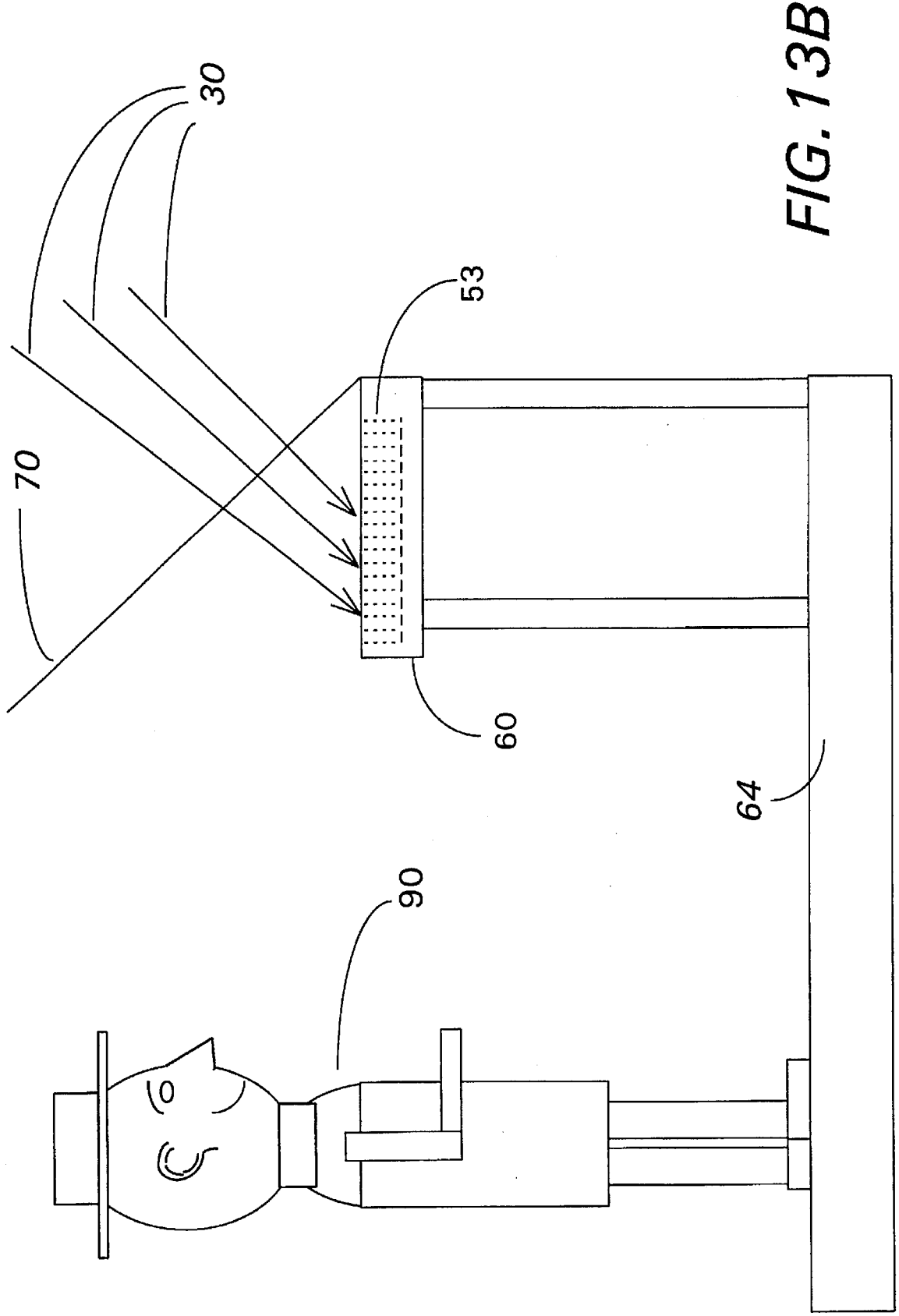

FIG. 13B is a drawing of the side view of a portion of a building showing the reflection eliminator 53 located within the shelf 60 as an integral part of said shelf 60 and showing a person 90, a floor 64, a window 70 and light rays 30 the direction and travel of which are indicated by arrows.

Figure 13C:
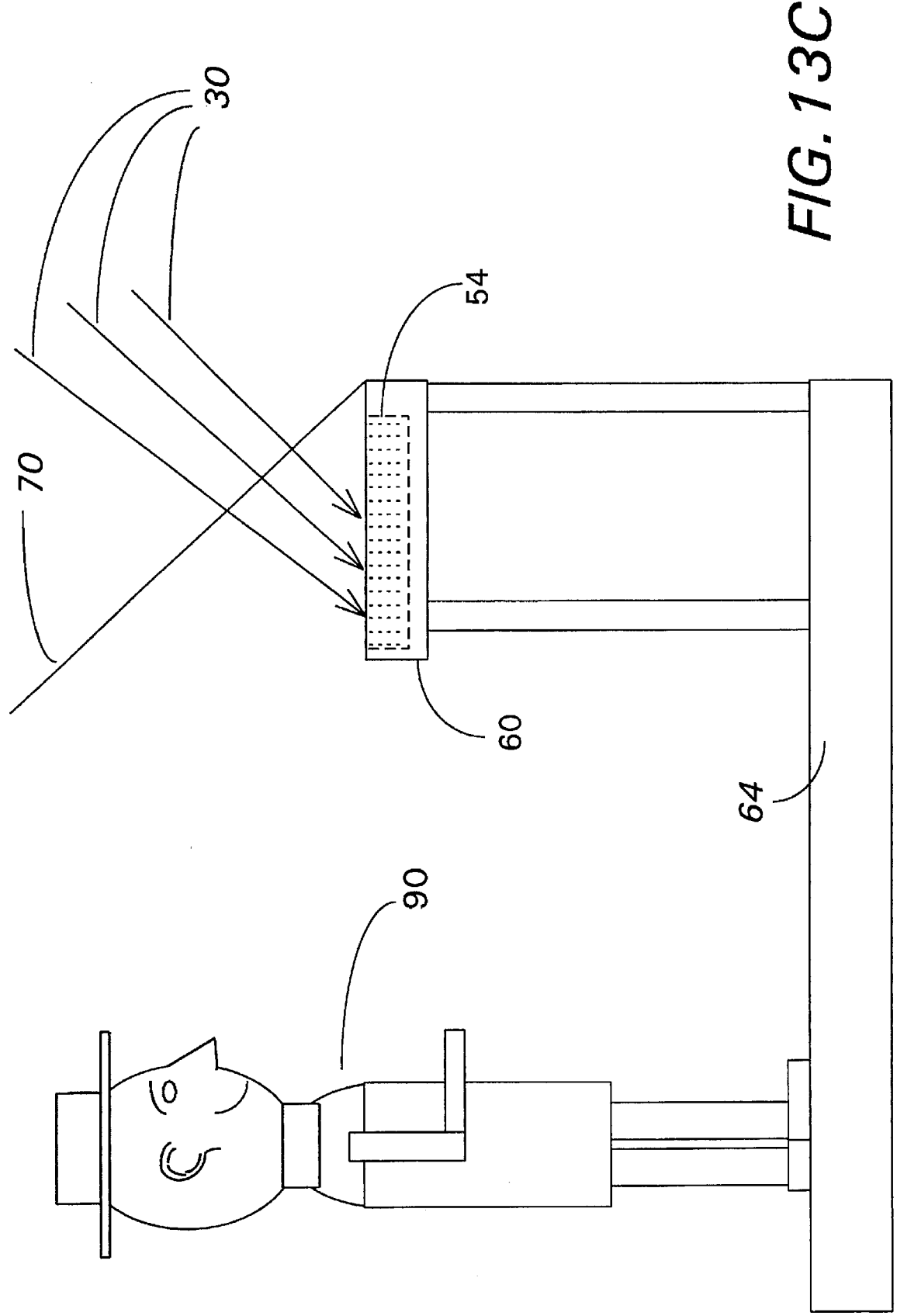

FIG. 13C is a drawing of the side view of a portion of a building the reflection eliminator 54 located within the shelf 60 as an integral part of said shelf 60 and showing a person 90, a floor 64, a window 70 and light rays 30 the direction and travel of which are indicated by arrows.

FIG. 14 is a drawing of the side view of a portion of a building showing a heat register 62, a floor 64, a window 70, a person 90 and light rays 30 and showing the direction, travel and reflection of said light rays 30 when the reflection eliminator 50, 52, 53 or 54 is not in use.

FIG. 15 is a drawing of the side view of a portion of a building showing the reflection eliminator 52 located as a separate item on the top of the heat register 62 and showing a floor 64, a window 70, a person 90 and light rays 30 the direction and travel of which are indicated by arrows.

FIG. 15A is a drawing of the side view of a portion of a building showing the reflection eliminator 53 located as a separate item on the top of the heat register 62 and showing a floor 64, a window 70, a person 90 and light rays 30 the direction and travel of which are indicated by arrows.

Figure 15B:
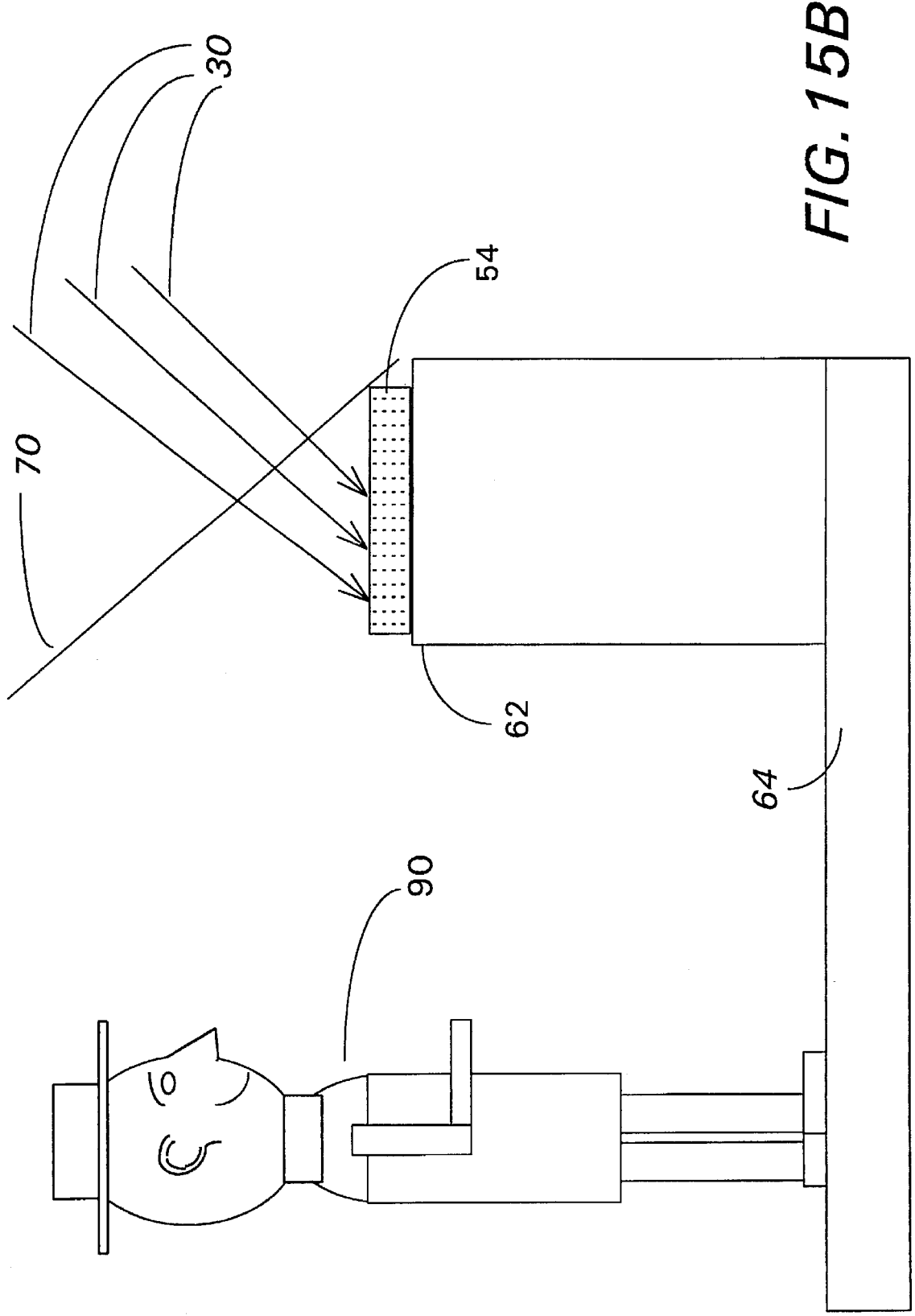

FIG. 15B is a drawing of the side view of a portion of a building showing the reflection eliminator 54 located as a separate item on the top of the heat register 62 and showing a floor 64, a window 70, a person 90 and light rays 30 the direction and travel of which are indicated by arrows.

FIG. 16 is a drawing of the side view of a portion of a building showing the reflection eliminator 50 located within the heat register 62 as an integral part of said heat register 62 and showing a person 90, a floor 64, a window 70 and light rays 30 the direction and travel of which are indicated by arrows.

Figure 16A:
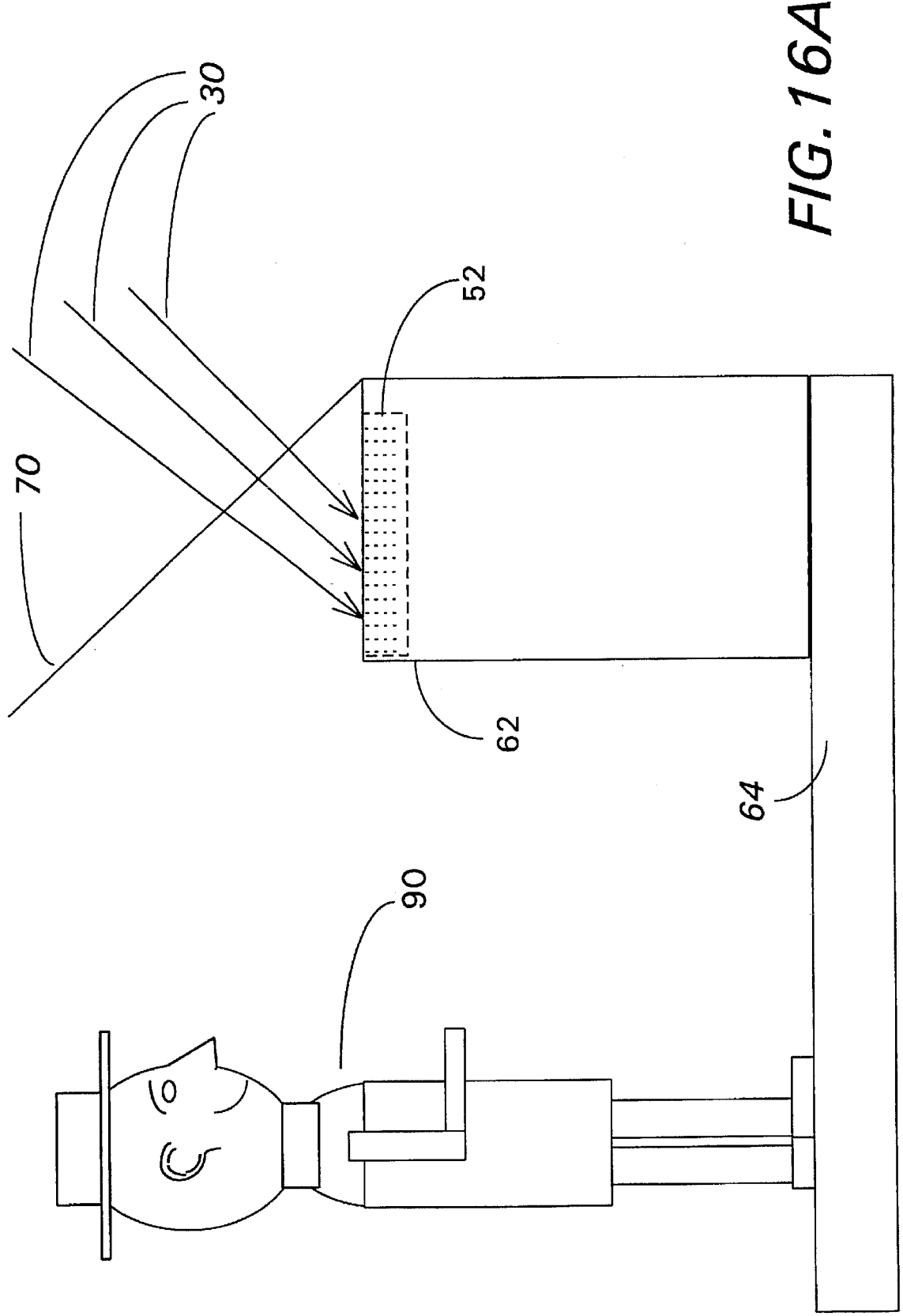

FIG. 16A is a drawing of the side view of a portion of a building showing the reflection eliminator 52 located within the heat register 62 as an integral part of said heat register 62 and showing a person 90, a floor 64, a window 70 and light rays 30 the direction and travel of which are indicated by arrows.

Figure 16B:
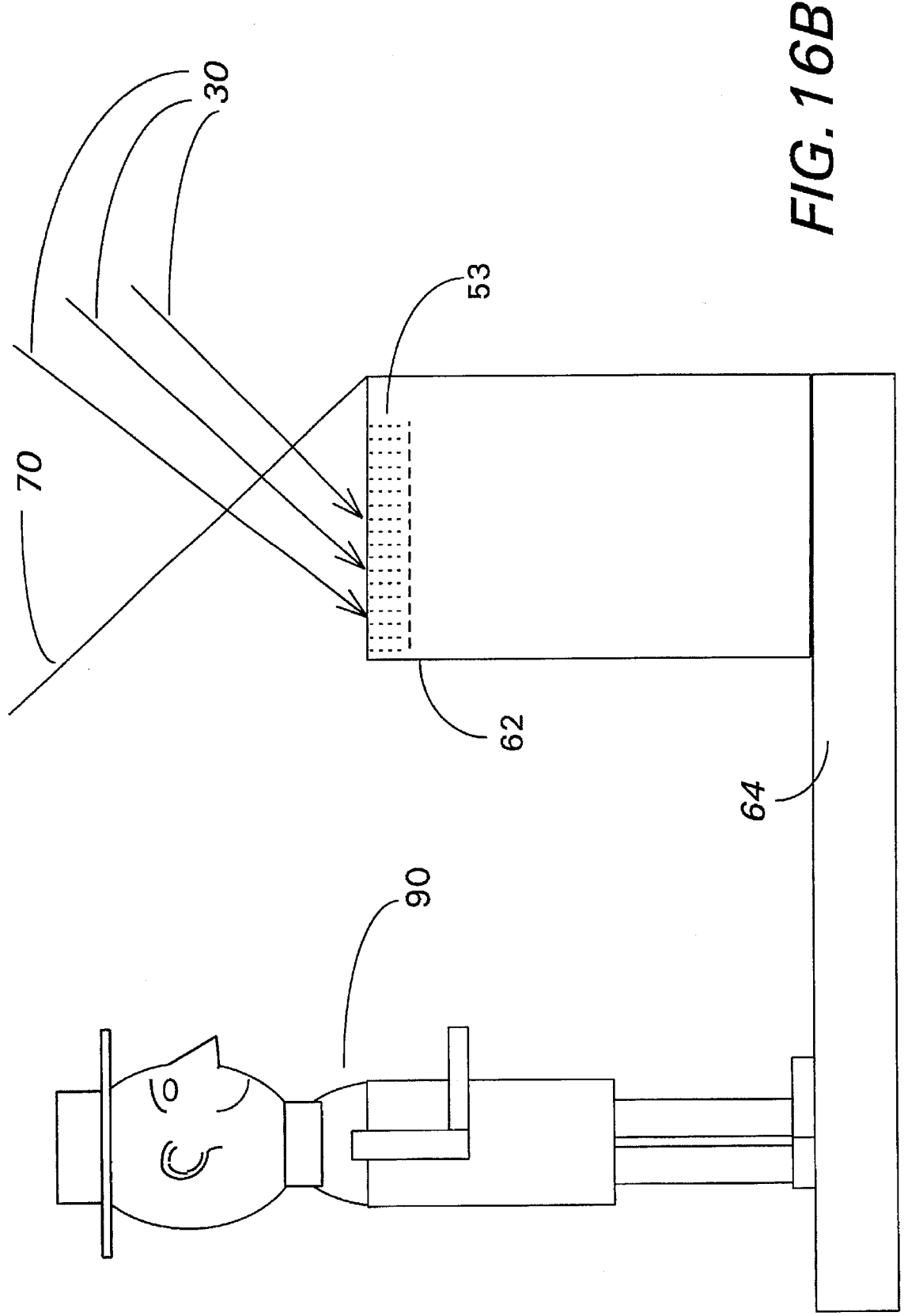

FIG. 16B is a drawing of the side view of a portion of a building showing the reflection eliminator 53 located within the heat register 62 as an integral part of said heat register 62 and showing a person 90, a floor 64, a window 70 and light rays 30 the direction and travel of which are indicated by arrows.

FIG. 16C is a drawing of the side view of a portion of a building showing the reflection eliminator 54 located within the heat register 62 as an integral part of said heat register 62 and showing a person 90, a floor 64, a window 70 and light rays 30 the direction and travel of which are indicated by arrows.

Figure 17:
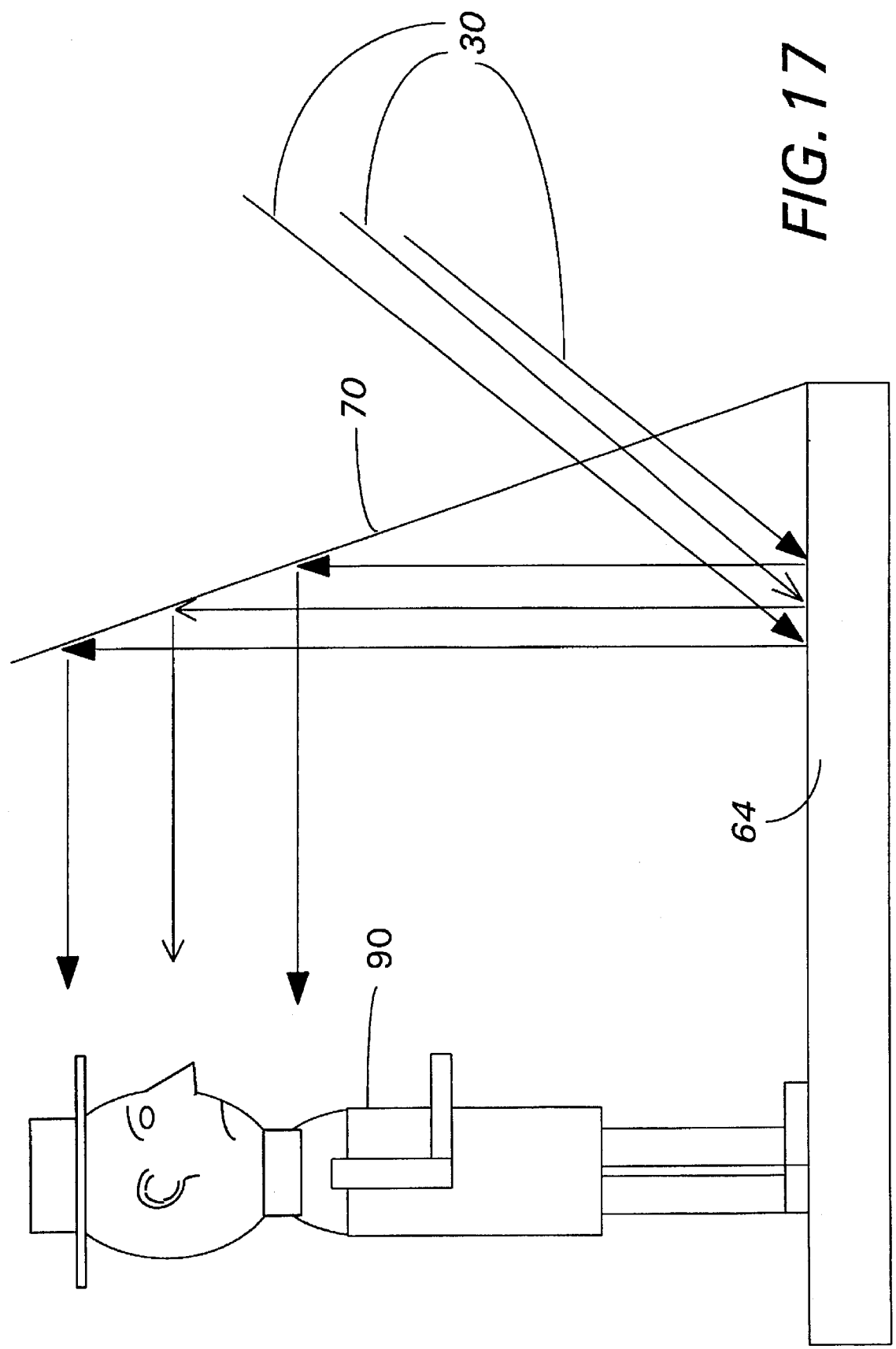

FIG. 17 is a drawing of the side view of a portion of a building showing a floor 64, a window 70, a person 90 and light rays 30 and showing the direction, travel and reflection of light rays 30 when the reflection eliminator 50, 52, 53 or 54 is not in use.

Figure 18:
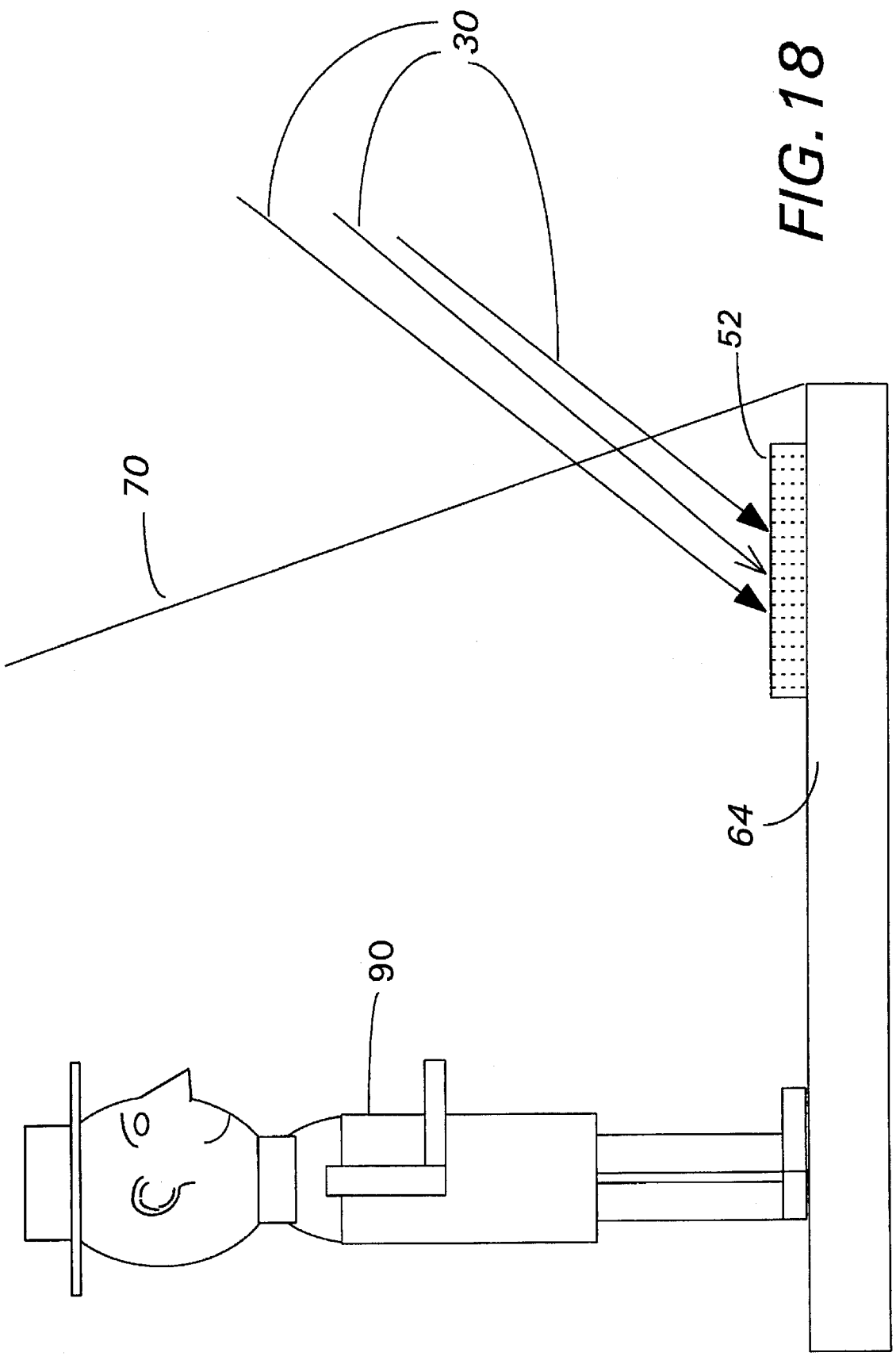

FIG. 18 is a drawing of the side view of a portion of a building showing the reflection eliminator 52 located as a separate item on the top of the floor 64 and showing a window 70, a person 90 and light rays 30 the direction and travel of which are indicated by arrows.

FIG. 18A is a drawing of the side view of a portion of a building showing the reflection eliminator 53 located as a separate item on the top of the floor 64 and showing a window 70, a person 90 and light rays 30 the direction and travel of which are indicated by arrows.

Figure 18B:
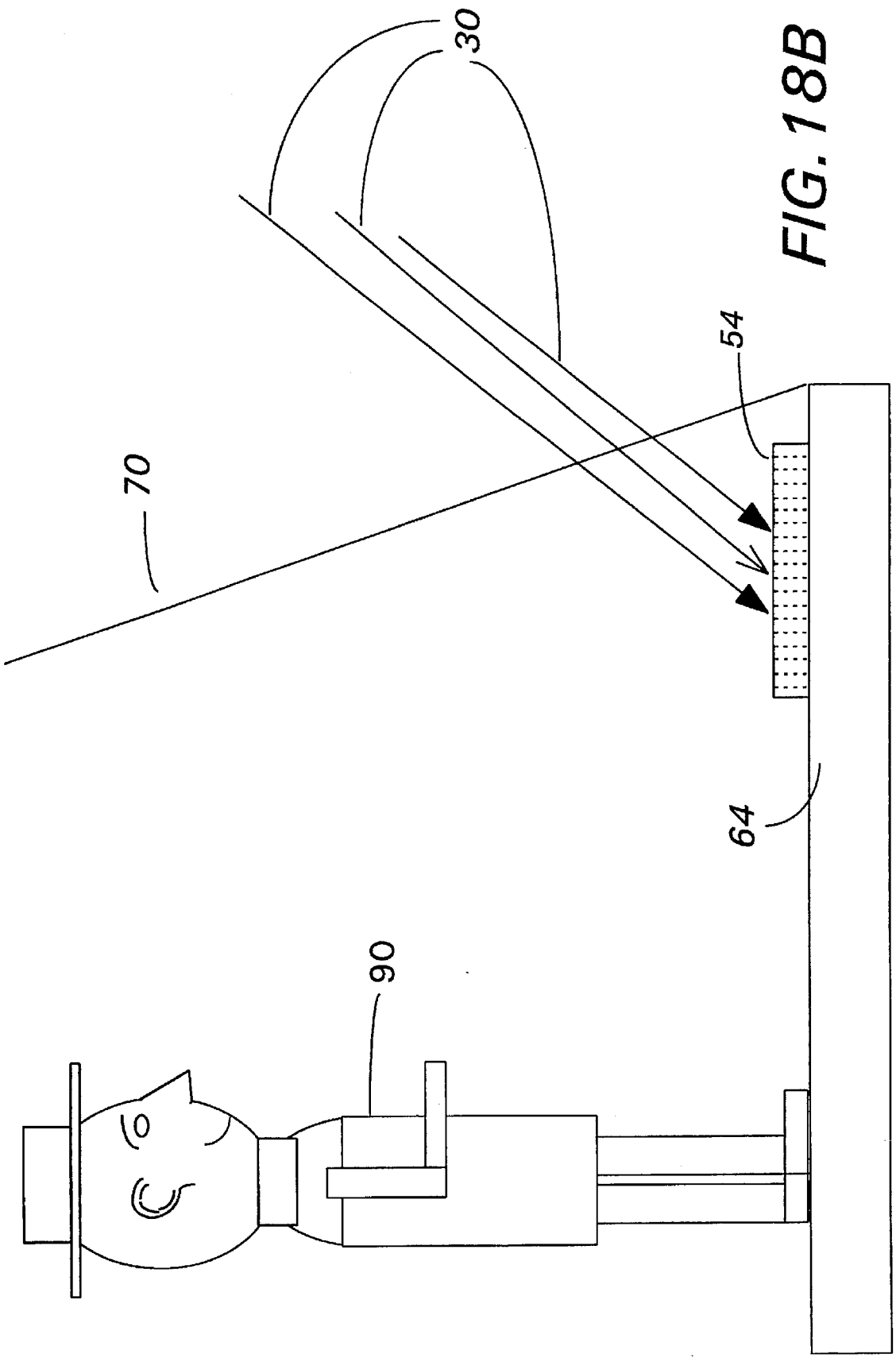

FIG. 18B is a drawing of the side view of a portion of a building showing the reflection eliminator 54 located as a separate item on the top of the floor 64 and showing a window 70, a person 90 and light rays 30 the direction and travel of which are indicated by arrows.

FIG. 19 is a drawing of the side view of a portion of a building showing the reflection eliminator 50 located within the floor 64 as an integral part of said floor 64 and showing a person 90, a window 70 and light rays 30 the direction and travel of which are indicated by arrows.

FIG. 19A is a drawing of the side view of a portion of a building showing the reflection eliminator 52 located within the floor 64 as an integral part of said floor 64 and showing a person 90, a window 70 and light rays 30 the direction and travel of which are indicated by arrows.

Figure 19B:
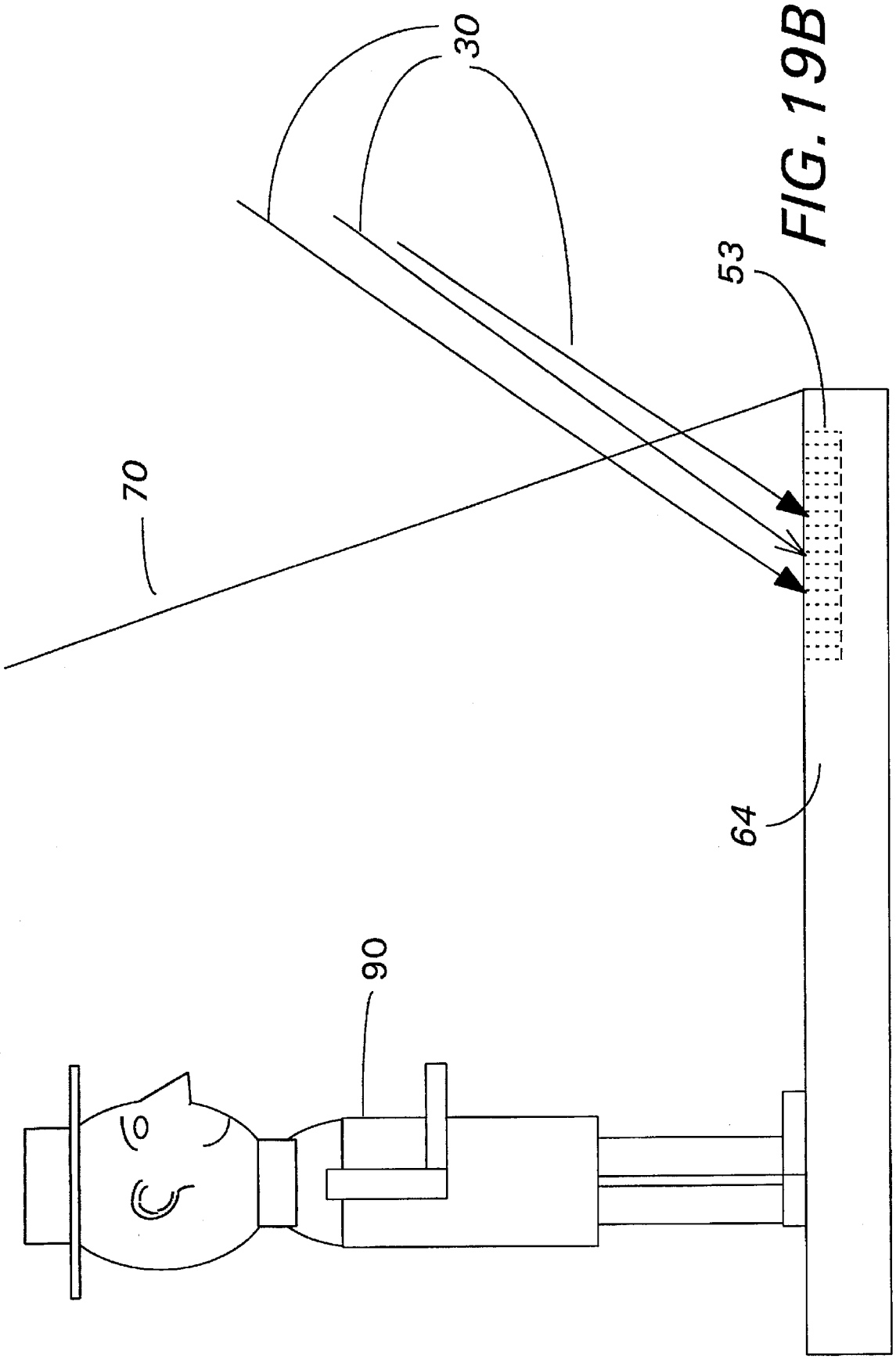

FIG. 19B is a drawing of the side view of a portion of a building showing the reflection eliminator 53 located within the floor 64 as an integral part of said floor 64 and showing a person 90, a window 70 and light rays 30 the direction and travel of which are indicated by arrows.

FIG. 19C is a drawing of the side view of a portion of a building showing the reflection eliminator 54 located within the floor 64 as an integral part of said floor 64 and showing a person 90, a window 70 and light rays 30 the direction and travel of which are indicated by arrows.

REFERENCE NUMERALS IN DRAWINGS 10 vertical members
12 vertical support members
14 bottom member
20A front window of a passenger or truck automobile
20B top portion of the instrument panel of a passenger or truck automobile
20C top portion of the package tray below the rear window of a passenger automobile
20D rear window of a passenger automobile
30 light rays
50 reflection eliminator with vertical members and with no vertical support members and with no bottom
52 reflection eliminator with vertical members and with vertical support members
53 reflection eliminator with vertical members and with a bottom
54 reflection eliminator with vertical members and with vertical support members and with a bottom
60 shelf
62 heat register
64 floor
70 window of a building
80 human occupant of a passenger or truck automobile
90 human occupant of a building

DESCRIPTION OF FIRST EMBODIMENT

In the first embodiment of this invention, the reflection eliminator is a separate unit and not an integral part of a vehicle or building. The vertical members 10 of the reflection eliminator 50, 52, 53 and 54 are in the vertical position.

The interval distances between the vertical members 10 are less than the height of said vertical members 10.

Said vertical members 10 in the reflection eliminator 52 are held in position by means of being attached to vertical support members 12.

Said vertical members 10 in the reflection eliminator 53 are held in position by means of being attached to a bottom 14.

Said vertical members 10 in the reflection eliminator 54 are held in position by means of being attached to a bottom 14 and to vertical support members 12.

The reflection eliminator 50, 52, 53 and 54 can be manufactured in any size depending on needs and applications. It can also be manufactured in a relatively over sized unit which can be trimmed to fit a particular application or space by the consumer, builder, automobile manufacturer or any user of the invention.

DESCRIPTION OF SECOND EMBODIMENT

In its second embodiment the reflection eliminator 50, 52, 53 or 54 is an integral part of a passenger automobile or truck automobile or a building.

The vertical members 10 of the reflection eliminator 50 are held in the vertical position and at the correct distance from each other by means of being attached to a part of a passenger automobile or truck automobile or to a part of a building of which this invention is an integral part.

The vertical members 10 of the reflection eliminator 52 are held in the vertical position and at the correct distance from each other by means of being attached to the vertical support members 12 or by means of being attached to a part of a passenger automobile or truck automobile or to a part of a building of which this invention is an integral part.

The vertical members 10 of the reflection eliminator 53 are held in the vertical position and at the correct distance from each other by means of being attached to the bottom 14 or by means of being attached to a part of a passenger automobile or truck automobile or to a part of a building of which this invention is an integral part.

The vertical members 10 of the reflection eliminator 54 are held in the vertical position and at the correct distance from each other by means of being attached to vertical support members 12 and to a bottom 14 or by means of being attached to a part of a passenger automobile or truck automobile or to a part of a building of which this invention is an integral part.

The reflection eliminator 52, 53 and 54 can be fabricated from a single piece of material.

The distance intervals between the vertical members 10 are less than the height of the vertical members 10.

The reflection eliminator 50, 52, 53 and 54 can be manufactured in any size depending on needs and applications. It can also be manufactured in a relatively over sized unit which can be trimmed to fit a particular application or space by the consumer, builder, automobile manufacturer or any user of the invention.

I claim:

1. A reflection eliminator structure for positioning on substantially horizontal surfaces located at or near the base of windows which are at angles from vertical to eliminate reflected images and reflected light rays;

said structure comprising a plurality of spaced apart vertical members constructed so that side surfaces of each member include the majority of the entire surface area of said each member and the side surfaces extend vertically, and said plurality of vertical members are spaced at intervals which are less in distance than the height of each member.

2. The structure of claim 1 wherein said vertical members are integral parts of a passenger automobile or truck automobile or heat register of a building or shelf of a building or floor of a building.

3. The structure of claim 1 wherein said vertical members are attached to one or more vertical support members.

4. The structure of claim 3 wherein said vertical members and said vertical support members are integral parts of a passenger automobile or truck automobile or heat register of a building or shelf of a building or floor of a building.

5. The structure of claim 1 wherein said vertical members are attached to a bottom.

6. The structure of claim 5 wherein said vertical members and said bottom are integral parts of a passenger automobile or truck automobile or heat register of a building or floor of a building or shelf of a building.

7. The structure of claim 1 wherein said vertical members are attached to one or more vertical support members and attached to a bottom.

8. The structure of claim 7 wherein said vertical members and said vertical support members and said bottom are integral parts of a passenger automobile or truck automobile or heat register of a building or shelf of a building or floor of a building.

* * * * *